US012696049B2

(12) United States Patent
Hashimoto et al.

(10) Patent No.: US 12,696,049 B2
(45) Date of Patent: Jul. 28, 2026

(54) INFORMATION PROVIDING APPARATUS, INFORMATION PROVIDING SYSTEM, INFORMATION PROVIDING METHOD, AND NON-TRANSITORY COMPUTER-READABLE MEDIUM

(71) Applicant: NEC Corporation, Tokyo (JP)

(72) Inventors: Yuki Hashimoto, Tokyo (JP); Goh Shibata, Tokyo (JP); Takayuki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 561 days.

(21) Appl. No.: 18/022,923

(22) PCT Filed: Sep. 30, 2020

(86) PCT No.: PCT/JP2020/037223
§ 371 (c)(1),
(2) Date: Feb. 23, 2023

(87) PCT Pub. No.: WO2022/070332
PCT Pub. Date: Apr. 7, 2022

(65) Prior Publication Data
US 2023/0308831 A1      Sep. 28, 2023

(51) Int. Cl.
H04W 4/02          (2018.01)
H04W 4/06          (2009.01)

(52) U.S. Cl.
CPC ........... H04W 4/023 (2013.01); H04W 4/025 (2013.01); H04W 4/06 (2013.01)

(58) Field of Classification Search
CPC ..... H04W 4/023; H04W 4/024; H04W 4/025; H04W 4/029; H04W 4/06
(Continued)

(56) References Cited

U.S. PATENT DOCUMENTS

| 9,820,096 B2 * | 11/2017 | Heo | ...................... | H04W 4/021 |
| 2008/0243794 A1 * | 10/2008 | Tanaka | ................... | G06F 16/337 |

(Continued)

FOREIGN PATENT DOCUMENTS

| JP | 2009-245389 A | 10/2009 |
| WO | 2009/011357 A1 | 1/2009 |

OTHER PUBLICATIONS

International Search Report for PCT Application No. PCT/JP2020/037223, mailed on Dec. 15, 2020.

*Primary Examiner* — Jean A Gelin
(74) *Attorney, Agent, or Firm* — Sughrue Mion, PLLC

(57)          ABSTRACT

A registration unit registers pieces of identification information of user terminals possessed by users, respectively, as a group. A position information acquisition unit acquires pieces of position information of the plurality of user terminals registered as the group. A reaching detection unit detects, from position information of a first user terminal possessed by one user, that the one user among the plurality of users registered as the group has reached a position where content information is provided. When the reaching is detected, a distance calculation unit calculates a distance between the first user terminal and another user terminal. In a case where the reaching is detected, a provision control unit provides the content information to the first user terminal, and controls provision of the content information to another user terminal possessed by another user of the group based on the calculated distance.

20 Claims, 26 Drawing Sheets

(58) Field of Classification Search
USPC ....................................................... 455/456.1
See application file for complete search history.

(56) References Cited

U.S. PATENT DOCUMENTS

| | | | | |
|---|---|---|---|---|
| 2010/0279706 A1* | 11/2010 | Dicke | ..................... | H04W 4/02 |
| | | | | 455/456.1 |
| 2010/0285815 A1* | 11/2010 | Treu | ...................... | G01S 5/0263 |
| | | | | 455/456.1 |
| 2012/0209730 A1* | 8/2012 | Garrett | ................... | G06Q 30/06 |
| | | | | 705/15 |
| 2012/0276929 A1* | 11/2012 | Park | ........................ | H04W 4/21 |
| | | | | 455/456.3 |
| 2015/0026580 A1* | 1/2015 | Kang | ................... | H04W 12/04 |
| | | | | 455/39 |
| 2015/0186892 A1* | 7/2015 | Zhang | ................. | G06Q 20/326 |
| | | | | 705/44 |
| 2016/0124537 A1* | 5/2016 | Kim | ................ | H04N 21/42224 |
| | | | | 345/173 |
| 2018/0300343 A1* | 10/2018 | Wu | ......................... | G06F 16/00 |
| 2019/0361694 A1* | 11/2019 | Gordon | ................... | G06F 9/452 |
| 2023/0162533 A1* | 5/2023 | Matsuzawa | .............. | G06T 7/20 |
| | | | | 382/115 |

* cited by examiner

| LOCATION | REPRODUCTION | CURRENT LATITUDE | CURRENT LONGITUDE | RADIUS | VOLUME | LENGTH | FILE NAME |
|---|---|---|---|---|---|---|---|
| POSITION A | AUDIO AR | LATITUDE $Y_A$ | LONGITUDE $X_A$ | 5m | FIVE TIMES | 10s | CONTENT A |
| POSITION B | STEREO | LATITUDE $Y_B$ | LONGITUDE $X_B$ | 3m | NINE TIMES | 25s | CONTENT B |
| POSITION C | STEREO | LATITUDE $Y_C$ | LONGITUDE $X_C$ | 7m | SIX TIMES | 33s | CONTENT C |

Fig. 10

| GROUP IDENTIFICATION INFORMATION | DEVICE | LATITUDE | LONGITUDE | REPRODUCTION CONTENT | MASTER FLAG |
|---|---|---|---|---|---|
| GROUP X | DEVICE A | LATITUDE $Y_A$ | LONGITUDE $X_A$ | CONTENT B | ◯ |
| GROUP X | DEVICE B | LATITUDE $Y_B$ | LONGITUDE $X_B$ | CONTENT B | |
| GROUP X | DEVICE C | LATITUDE $Y_C$ | LONGITUDE $X_C$ | NOT REPRODUCTION TARGET | |
| GROUP Y | DEVICE D | LATITUDE $Y_D$ | LONGITUDE $X_A$ | CONTENT C | |
| GROUP Y | DEVICE E | LATITUDE $Y_E$ | LONGITUDE $X_B$ | CONTENT C | ◯ |
| GROUP Y | DEVICE F | LATITUDE $Y_F$ | LONGITUDE $X_C$ | CONTENT $\beta$ | |

Fig. 11

| TIME ZONE | ADJUSTMENT VALUE |
|---|---|
| 0:00 TO 7:00 | a |
| 7:00 TO 11:00 | b |
| 11:00 TO 16:00 | c |
| 16:00 TO 20:00 | d |
| 20:00 TO 24:00 | e |

Fig. 20

| PREVIOUS GEOFENCE | CURRENT GEOFENCE | CONTENT TYPE |
|-------------------|------------------|--------------|
| G1                | G3               | A            |
| G2                | G3               | B            |

Fig. 23

| ANGLE WITHIN OR OUTSIDE ANGLE THRESHOLD FOR PREVIOUS GEOFENCE | ANGLE WITHIN OR OUTSIDE ANGLE THRESHOLD FOR CURRENT GEOFENCE | CONTENT TYPE |
|---|---|---|
| OUTSIDE ANGLE THRESHOLD FOR G2 | WITHIN ANGLE THRESHOLD FOR G3 | C |
| WITHIN ANGLE THRESHOLD FOR G2 | WITHIN ANGLE THRESHOLD FOR G3 | D |

Fig. 25

INFORMATION PROVIDING APPARATUS, INFORMATION PROVIDING SYSTEM, INFORMATION PROVIDING METHOD, AND NON-TRANSITORY COMPUTER-READABLE MEDIUM

This application is a National Stage Entry of PCT/JP2020/037223 filed on Sep. 30, 2020, the contents of all of which are incorporated herein by reference, in their entirety.

TECHNICAL FIELD

The present disclosure relates to an information providing apparatus, an information providing system, an information providing method, and a program.

BACKGROUND ART

In recent years, with the spread of communication apparatuses such as smartphones, services using position information called geofences have started. The geofence is an area surrounded by a virtual fence (boundary line) provided on a map. Such a geofence is set, and information regarding a shop such as an advertisement or a coupon is provided from the shop or the like in the geofence to a user terminal possessed by a user who has entered the geofence.

Meanwhile, in a case where such an information providing service is provided to a plurality of users who act in a group, it may be desirable to share an empathy experience by the information provision/service such as an audio service.

For example, Patent Literature 1 describes a system that provides, to a user, a detailed description of an exhibit such as an introduction of an artist of an artistic work. In the system, when a reader/writer detects an IC tag, an audio information distribution server specifies a group to which an owner of the IC tag belongs from a user ID stored in the IC tag, and distributes audio information, which is a sub-content of video information, to a personal digital assistant (PDA) possessed by a user belonging to the specified group.

In addition, Patent Literature 2 discloses a content reproduction system in which an audio guide is reproduced in synchronization by a plurality of grouped guide terminals. When all or some (for example, a majority) of the grouped guide terminals enter an observation area of any exhibit, that is, a range in which an area marker reaches, a content reproduction unit of a master unit sends an instruction to a slave unit to reproduce a guide content corresponding to the observation area (exhibit).

CITATION LIST

Patent Literature

Patent Literature 1: International Patent Publication No. WO2009/011357
Patent Literature 2: Japanese Unexamined Patent Application Publication No. 2009-245389

SUMMARY OF INVENTION

Technical Problem

However, in the related art, the position of each user in the group is not considered. Therefore, a content cannot be appropriately provided to users acting in a group based on position information of the users.

The present disclosure has been made to solve such a problem, and an object of the present disclosure is to provide an information providing apparatus, an information providing system, an information providing method, a program, and the like capable of appropriately providing information to a plurality of users acting in a group.

Solution to Problem

An information providing apparatus according to a first aspect of the present disclosure includes: a storage unit configured to store content information and provision position information indicating a position where the content information is provided in association with each other; a registration unit configured to register pieces of identification information of a plurality of user terminals possessed by a plurality of users, respectively, as a group; a position information acquisition unit configured to acquire pieces of position information of the plurality of user terminals registered as the group; a reaching detection unit configured to detect, from the position information of a first user terminal possessed by one user, that the one user among the plurality of users registered as the group has reached the position where the content information is provided; a distance calculation unit configured to calculate a distance between the first user terminal and another user terminal in a case where the reaching is detected; and a provision control unit configured to provide the content information to the first user terminal and controls provision of the content information to another user terminal possessed by another user of the group based on the calculated distance in a case where the reaching is detected.

An information providing system according to a second aspect of the present disclosure includes: a storage unit configured to store content information and provision position information indicating a position where the content information is provided in association with each other; a registration unit configured to register pieces of identification information of a plurality of user terminals possessed by a plurality of users, respectively, as a group; a position information acquisition unit configured to acquire pieces of position information of the plurality of user terminals registered as the group; a reaching detection unit configured to detect, from the position information of a first user terminal possessed by one user, that the one user among the plurality of users registered as the group has reached the position where the content information is provided; a distance calculation unit configured to calculate a distance between the first user terminal and another user terminal in a case where the reaching is detected; and a provision control unit configured to provide the content information to the first user terminal and controls provision of the content information to another user terminal possessed by another user of the group based on the calculated distance in a case where the reaching is detected.

An information providing method according to a third aspect of the present disclosure includes: storing content information and provision position information indicating a position where the content information is provided in association with each other; registering pieces of identification information of a plurality of user terminals possessed by a plurality of users, respectively, as a group; acquiring pieces of position information of the plurality of user terminals registered as the group; detecting, from the position information of a first user terminal possessed by one user, that the one user among the plurality of users registered as the group has reached the position where the content information is provided; calculating a distance between the first user terminal and another user terminal in a case where the reaching is detected; and providing the content information to the first user terminal and controls provision of the content information to another user terminal possessed by another user of the group based on the calculated distance in a case where the reaching is detected.

A non-transitory computer-readable medium according to a fourth aspect of the present disclosure stores a program that causes a computer to perform: storing content information and provision position information indicating a position where the content information is provided in association with each other; registering pieces of identification information of a plurality of user terminals possessed by a plurality of users, respectively, as a group; acquiring pieces of position information of the plurality of user terminals registered as the group; detecting, from the position information of a first user terminal possessed by one user, that the one user among the plurality of users registered as the group has reached the position where the content information is provided; calculating a distance between the first user terminal and another user terminal in a case where the reaching is detected; and providing the content information to the first user terminal and controls provision of the content information to another user terminal possessed by another user of the group based on the calculated distance in a case where the reaching is detected.

Advantageous Effects of Invention

According to the present disclosure, it is possible to provide an information providing apparatus, an information providing system, an information providing method, a program, and the like capable of appropriately providing information to users acting in a group.

BRIEF DESCRIPTION OF DRAWINGS

FIG. 10 is a table illustrating an example of an audio information list.

FIG. 11 is a table illustrating an example of a group identification information list.

FIG. 20 is a table illustrating an adjustment value for each time zone.

FIG. 23 is a diagram illustrating an example of changing the type of content associated with the same geofence.

FIG. 25 is a diagram illustrating an example of changing the type of content associated with the same geofence.

EXAMPLE EMBODIMENT

First Example Embodiment

Example embodiments of the present disclosure are described below with reference to the drawings.

Figure 1:
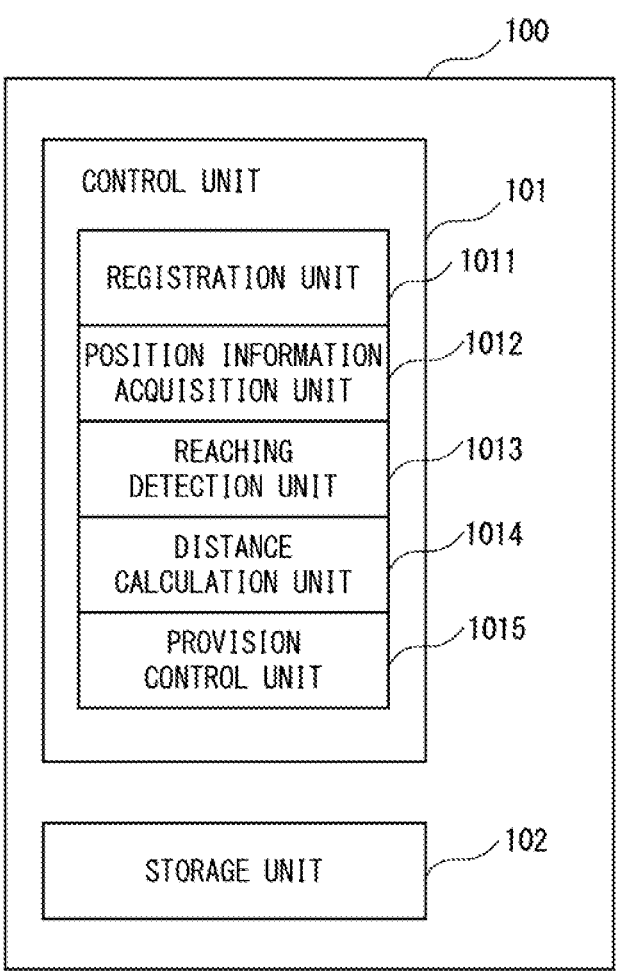
FIG. 1 is a diagram for describing a configuration example of an information providing apparatus according to a first example embodiment.

An information providing apparatus according to the present example embodiment will be described with reference to FIG. 1.

An information providing apparatus 100 is an information processing apparatus implemented by a computer. The information providing apparatus 100 includes a storage unit 102, a registration unit 1011, a position information acquisition unit 1012, a reaching detection unit 1013, a distance calculation unit 1014, and a provision control unit 1015.

The storage unit 102 stores content information and provision position information indicating a position where the content information is provided in association with each other. The registration unit 1011 registers pieces of identification information of a plurality of user terminals possessed by a plurality of users, respectively, as a group. The position information acquisition unit 1012 acquires pieces of position information of the plurality of user terminals registered as the group. The reaching detection unit 1013 detects, from the position information of a first user terminal possessed by one user, that the one user among the plurality of users registered as the group has reached the position where the content information is provided. In a case where the reaching is detected, the distance calculation unit 1014 calculates a distance between the first user terminal and another user terminal. In a case where the reaching is detected, the provision control unit 1015 provides the content information to the first user terminal, and controls provision of the content information to another user terminal possessed by another user of the group based on the calculated distance.

Figure 2:
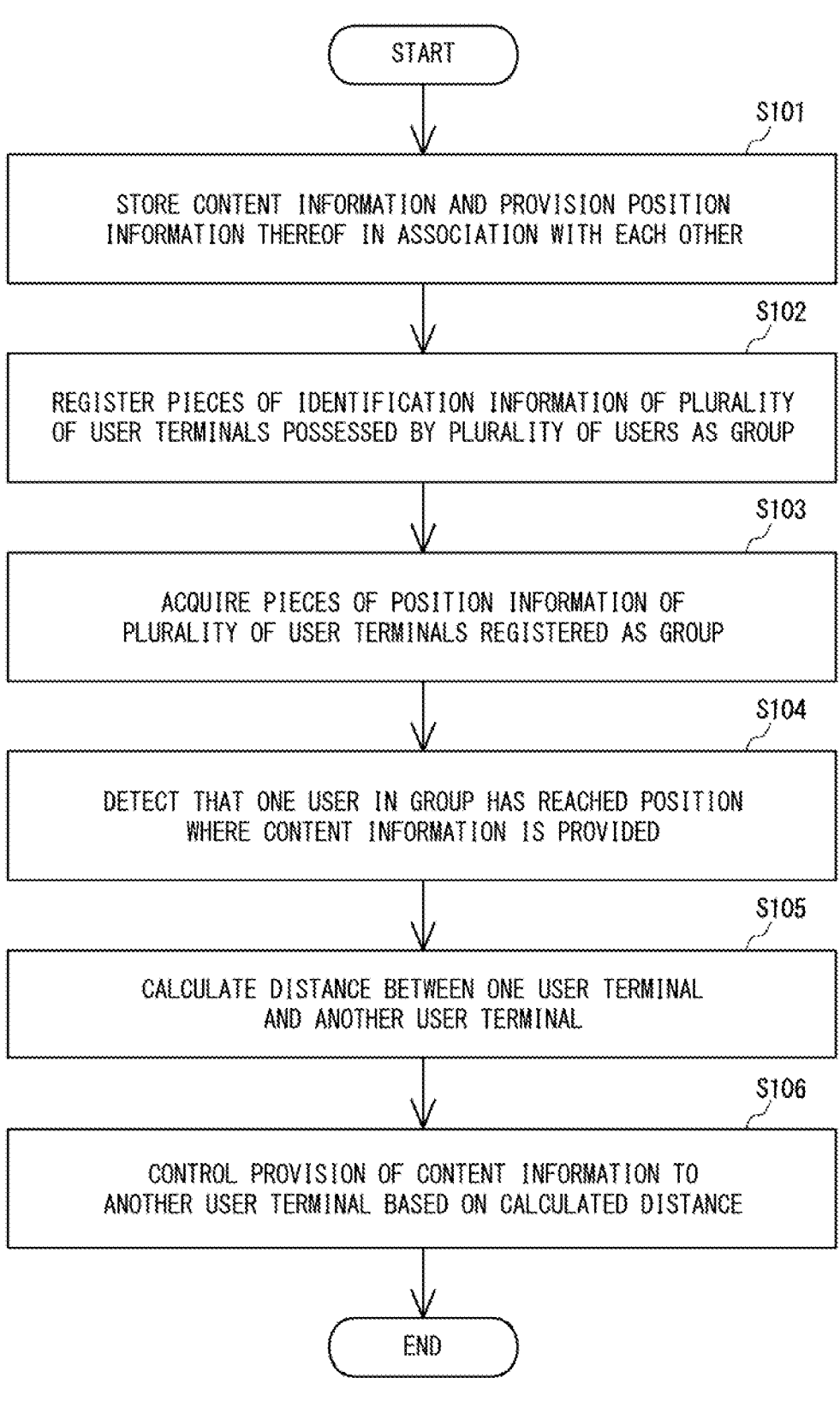
FIG. 2 is a flowchart illustrating an information providing method according to the first example embodiment.

FIG. 2 is a flowchart illustrating an information providing method according to the first example embodiment. The information providing method includes the following steps. The content information and the provision position information indicating the position where the content information is provided are stored in association with each other (Step S101). The pieces of identification information of the plurality of user terminals possessed by the plurality of users, respectively, are registered as the group (Step S102). The pieces of position information of the plurality of user terminals registered as the group are acquired (Step S103). It is detected from the position information of the first user terminal possessed by one user that the one user among the plurality of users registered as the group has reached the position where the content information is provided (Step S104).

In a case where the reaching is detected, the distance between the first user terminal and another user terminal is calculated (Step S105). In a case where the reaching is detected, the content information is provided to the first user terminal, and provision of the content information to another user terminal possessed by another user of the group is controlled based on the calculated distance (Step S106).

According to the present example embodiment described above, information can be appropriately provided to a plurality of users acting in a group.

Second Example Embodiment

Figure 3:
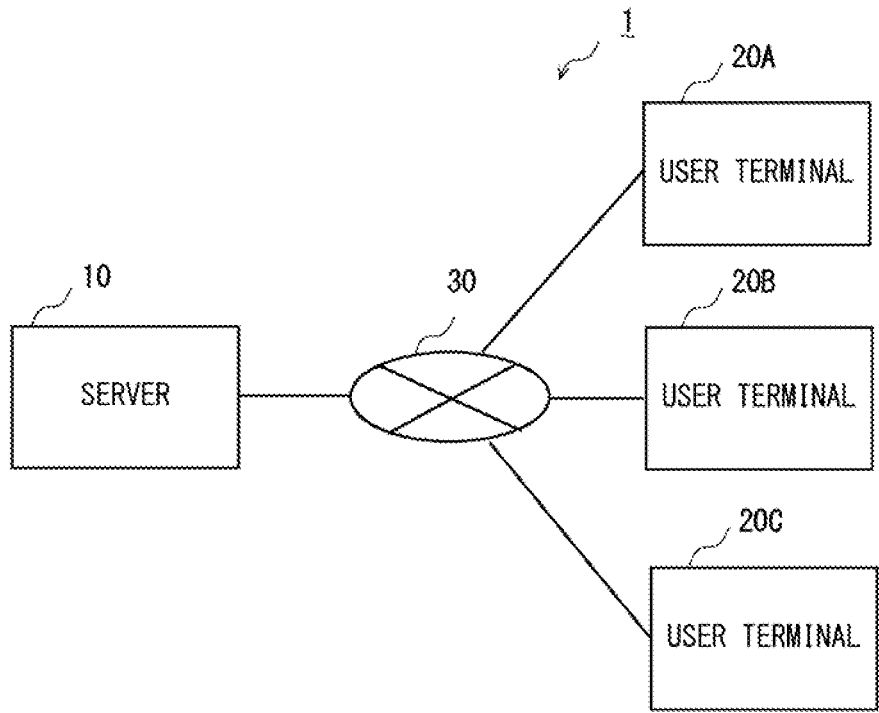
FIG. 3 is a diagram for describing a configuration example of an information providing system according to a second example embodiment.

FIG. 3 is a diagram for describing a configuration example of an information providing system.

An information providing system 1 includes a server 10 (which may also be referred to as an information providing apparatus) and one or more user terminals 20 connected to the server 10 via a wired or wireless network 30. Although three user terminals 20A, 20B, and 20C are illustrated in FIG. 3, the present invention is not limited thereto, and four or more user terminals may be provided. The network 30 can include a local area network (LAN) and a wide area network (WAN) such as the Internet or a mobile communications network. The server 10 is an example of the information providing apparatus according to the first example embodiment.

The server 10 provides, to a user who has entered a geofence, for example, information regarding a specific target, facility, store, or the like on a map (for example, a coupon or an event) or a guidance service (which may also be referred to as a content service) in which "video AR" and "audio AR" are combined. In the present example embodiment, in particular, a content including an audio content is provided. These targets are associated with a preset geofence. Herein, the geofence may also be simply referred to as a region.

Figure 4:
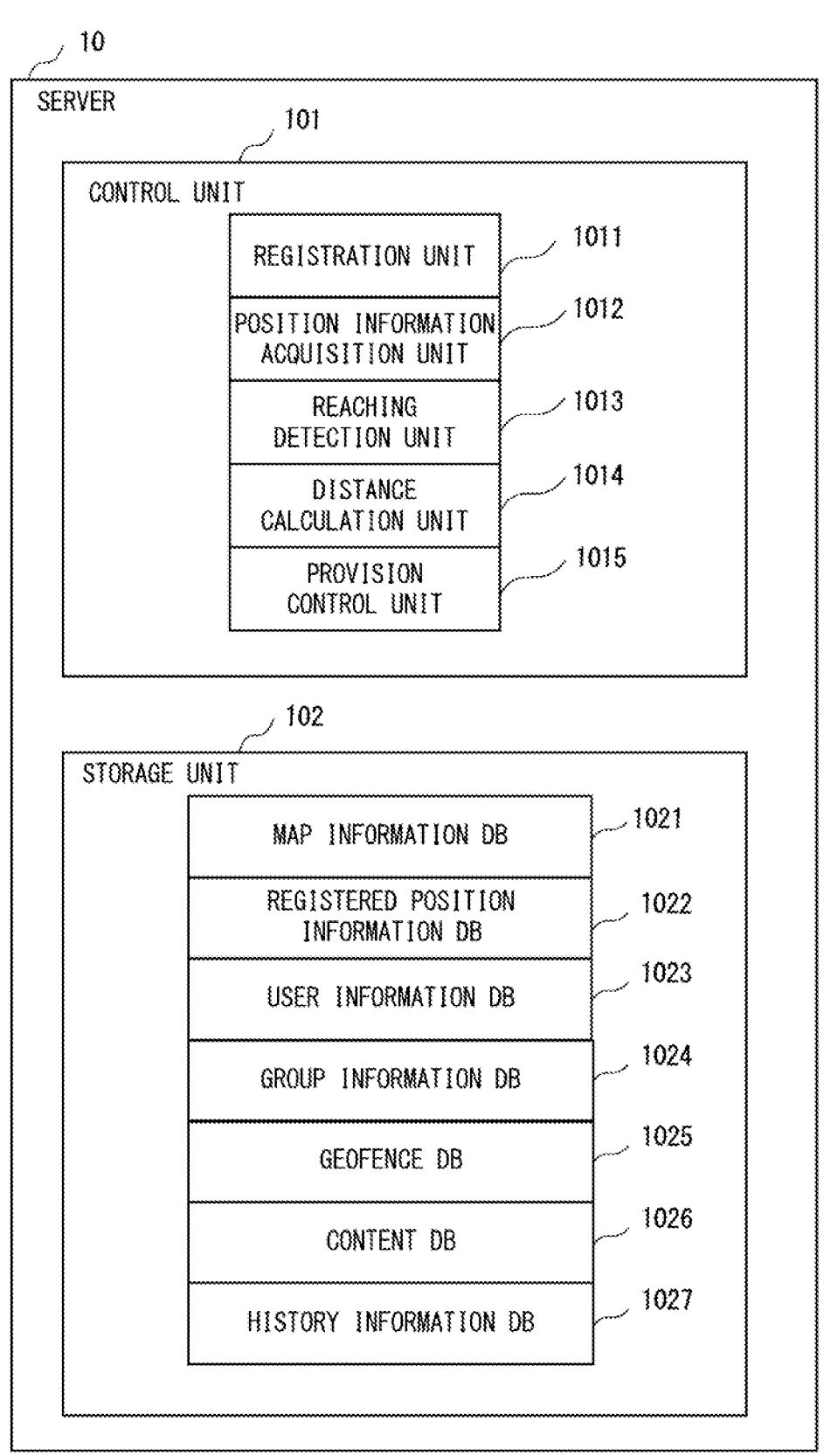
FIG. 4 is a diagram for describing a configuration example of a server according to the second example embodiment.

FIG. 4 is a block diagram for describing a configuration example of the server.

The server 10 is a computer including a control unit 101 and the storage unit 102. The control unit 101 includes a processor such as a central processing unit (CPU). The control unit 101 includes the registration unit 1011, the position information acquisition unit 1012, the reaching detection unit 1013, the distance calculation unit 1014, and the provision control unit 1015.

The registration unit 1011 registers the group in which the plurality of users and the plurality of user terminals are associated with each other in a group information database 1024 of the storage unit 102. For example, the registration unit 1011 can receive a group registration request from the user terminal 20 and register the group in the group information database 1024. A group ID for uniquely identifying a group is assigned to each group, and a plurality of user IDs, a plurality of user terminal IDs, and the like are collectively managed.

The position information acquisition unit 1012 acquires the position information (for example, position information obtained by a GPS receiver of the user terminal) of the user terminal possessed by the user. The position information acquisition unit 1012 acquires the position information of each of the plurality of user terminals. The position information acquisition unit 1012 acquires the pieces of position information of the plurality of user terminals registered as the group, and manages the pieces of position information of the respective user terminals as the group.

The reaching detection unit 1013 detects, from the position information of the first user terminal possessed by one user, that the one user among the plurality of users registered as the group has reached the position where the content information is provided (for example, a designated geofence). Here, the one user who has reached the position where the content information is provided may be a user who has first reached the position, or may be an arbitrarily determined representative in the group. Such a user may also be referred to as a master user. In addition, a user terminal possessed by the user who has first reached the position or the arbitrarily determined representative in the group may also be referred to as a master device.

In a case where the reaching is detected, the distance calculation unit 1014 calculates the distance between the user terminals from the position information of each user terminal. Specifically, a distance between a user terminal serving as the master device and another user terminal of the group is calculated.

In a case where the reaching is detected, the provision control unit 1015 provides the content information to the first user terminal. The provision control unit 1015 controls provision of the content to another user terminal based on the calculated distance of each user terminal when the reaching is detected.

The storage unit 102 includes a map information database 1021, a registered position information database 1022, a user information database 1023, the group information database 1024, a geofence database 1026, a content database 1026, and a history information database 1027.

The map information database 1021 can include information such as a road network including a roadway, a sidewalk, and the like, a branch point including an intersection, a T-junction, and the like, a traffic light, a traffic sign, various buildings, facilities, and the like.

The registered position information database 1022 stores, for example, information regarding a registered target such as a shop, a building, an art gallery, a movie theater, remains, or a sightseeing spot. In addition, the registered position information database 1022 can store position information of various objects such as a sign, a signboard, a mannequin, a mascot doll, an animal, and a firework. When a staff of a facility registers such information in the information providing system 1 in advance, such information can be provided to the user terminal 20 of a user who has entered a geofence associated with the facility. Content data in which information related to registered position information is combined with the video AR or audio AR may be provided.

The user information database 1023 can include information regarding a user who desires to receive the content information via the user terminal 20 (attribute information of the user) such as a user ID of the user, a password, a terminal ID, terminal position information, an age, a sex, a hobby, and a taste. Furthermore, the user information database 1023 can include information regarding a target for which the user desires to receive information, such as various objects including a shop, a building, an art gallery, a movie theater, remains, a sightseeing spot, a sign, a signboard, a mannequin, a mascot doll, an animal, and a firework. The user ID is an identifier that uniquely identifies the user. User identification information is not limited to the user ID, and includes information that can uniquely identify the user by a combination of a name, an affiliation, a date of birth, and the like, of the user. The terminal ID is an identifier that uniquely identifies the terminal. Terminal identification information is not limited to the terminal ID, and includes information that can uniquely identify the terminal by a combination of a manufacturing year, a manufacturer name, and a product number.

The group information database 1024 stores a registration group including the plurality of users. The group information database 1024 includes a group ID, each group member ID, a master device ID, and a master user ID. The group ID is an identifier that uniquely identifies the group.

The geofence database 1025 can include a geofence ID, a latitude, a longitude, a range, a size, an entry angle threshold, and an exit angle threshold of a set geofence in association with the registered position information described above. The geofence ID is an identifier that uniquely identifies the geofence. The entry angle threshold and the exit angle threshold are arbitrarily set by a content provider. Each of the entry angle threshold and the exit angle threshold have an upper limit threshold and a lower limit threshold. The entry angle threshold and the exit angle threshold are compared with an actual entry angle and an actual exit angle of the user, and if the entry angle and the exit angle of the user are within a threshold range, that is, within a range of the upper limit threshold and the lower limit threshold, the content is provided to the user. If the entry angle and the exit angle of the user are outside the threshold range, that is, outside the range of the upper limit threshold and the lower limit threshold, the provision control unit 1015 does not provide the content to the user.

The content database 1026 may include the content information associated with the geofence ID and the user ID. The content information may be a content including the audio AR and having a predetermined reproduction time, or may be content data having a predetermined reproduction time and in which the video AR and the audio AR are combined. The length of the content, that is, the predetermined reproduction time, can be arbitrarily set in consideration of a walking speed of the user, a distance between the geofence and the shop, and the like.

Furthermore, the history information database 1027 can store the user terminal ID, the geofence ID, and content provision history information. Further, the history information database 1026 may further store a content information provision time. The history information database 1026 is also referred to as a history information storage unit.

In the above example, the storage unit 102 is provided inside the server 10, but the storage unit 102 may be provided outside the server 10. In this case, the present invention can be implemented by a server connected to a storage unit provided outside the server 10 via a network as long as the storage unit is provided in the information providing system.

The user terminal 20 is, for example, a computer that can be carried by a user walking in a town, and can be, for example, a portable terminal such as a smartphone, a wearable device, a smart watch, or a hearable device.

Figure 5:
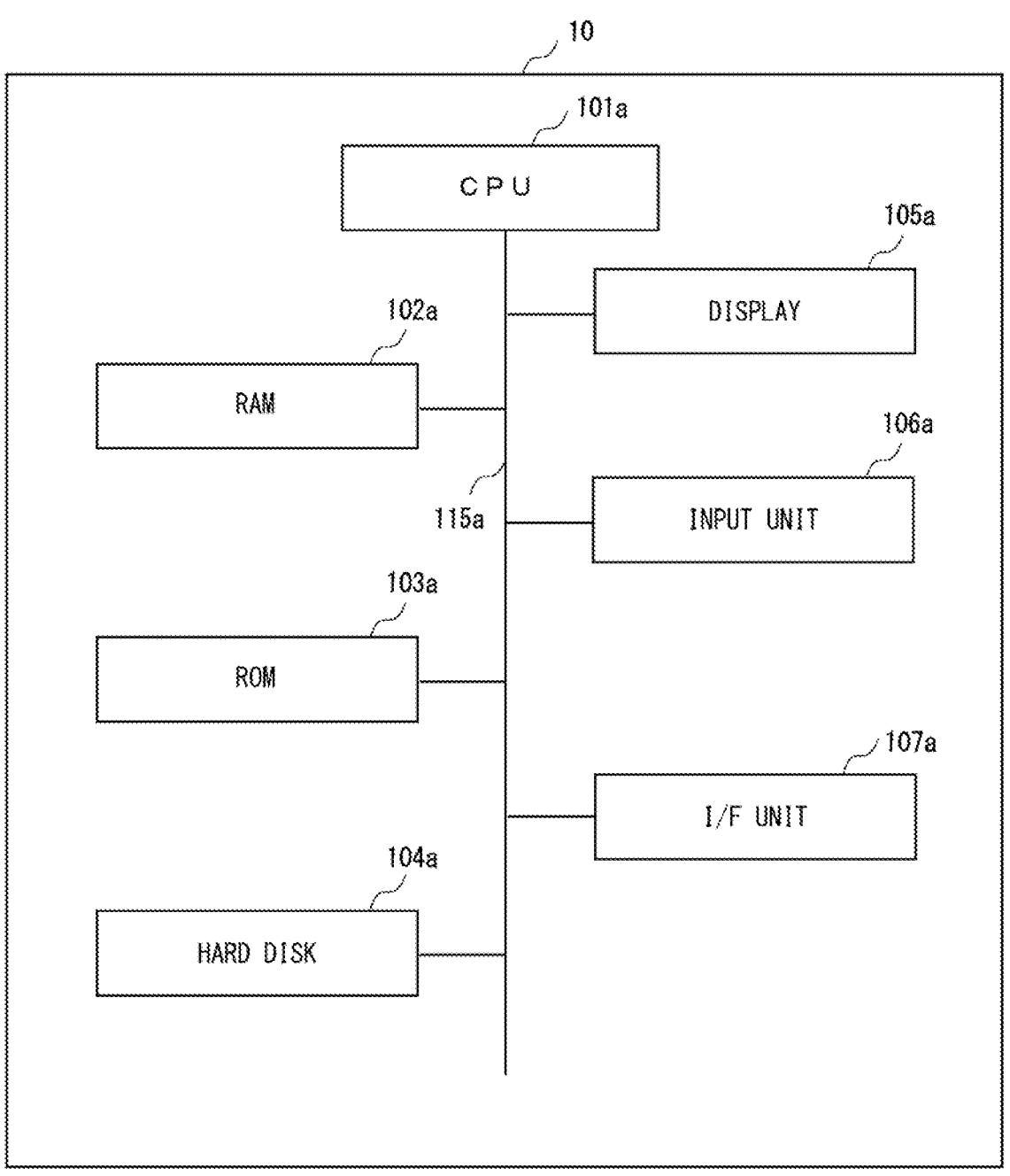
FIG. 5 is a diagram illustrating a hardware configuration example of the server according to the second example embodiment.

FIG. 5 is a block diagram illustrating a hardware configuration example of the server 10 in the present example embodiment. As illustrated in FIG. 5, the server 10 is a computer (information processing apparatus) including a CPU 101*a*, a RAM 102*a*, a ROM 103*a*, and the like. The CPU 101*a* performs calculation and control according to software stored in the RAM 102*a*, the ROM 103*a*, or a hard disk 104*a* (the CPU is also simply referred to as a processor). The RAM 102*a* is used as a temporary storage region when the CPU 101*a* performs various types of processing. The hard disk 104*a* stores an operating system (OS), a registration program, and the like. A display 105*a* includes a liquid crystal display and a graphic controller, and objects such as images and icons, GUIs, and the like are displayed on the display 105*a*. An input unit 106*a* is an apparatus for a user to give various instructions to the server 10 and is implemented by, for example, a button, a keyboard, a screen keyboard, a mouse, or the like. An interface (I/F) unit 107*a* can control wireless LAN communication and wired LAN communication compatible with a standard such as IEEE 802.11a, and communicates with an external device via the same communication network and the Internet based on a protocol such as TCP/IP. A system bus 115*a* controls data transmission and reception to and from the CPU 101*a*, the RAM 102*a*, the ROM 103*a*, the hard disk 104*a*, and the like.

Figure 6:
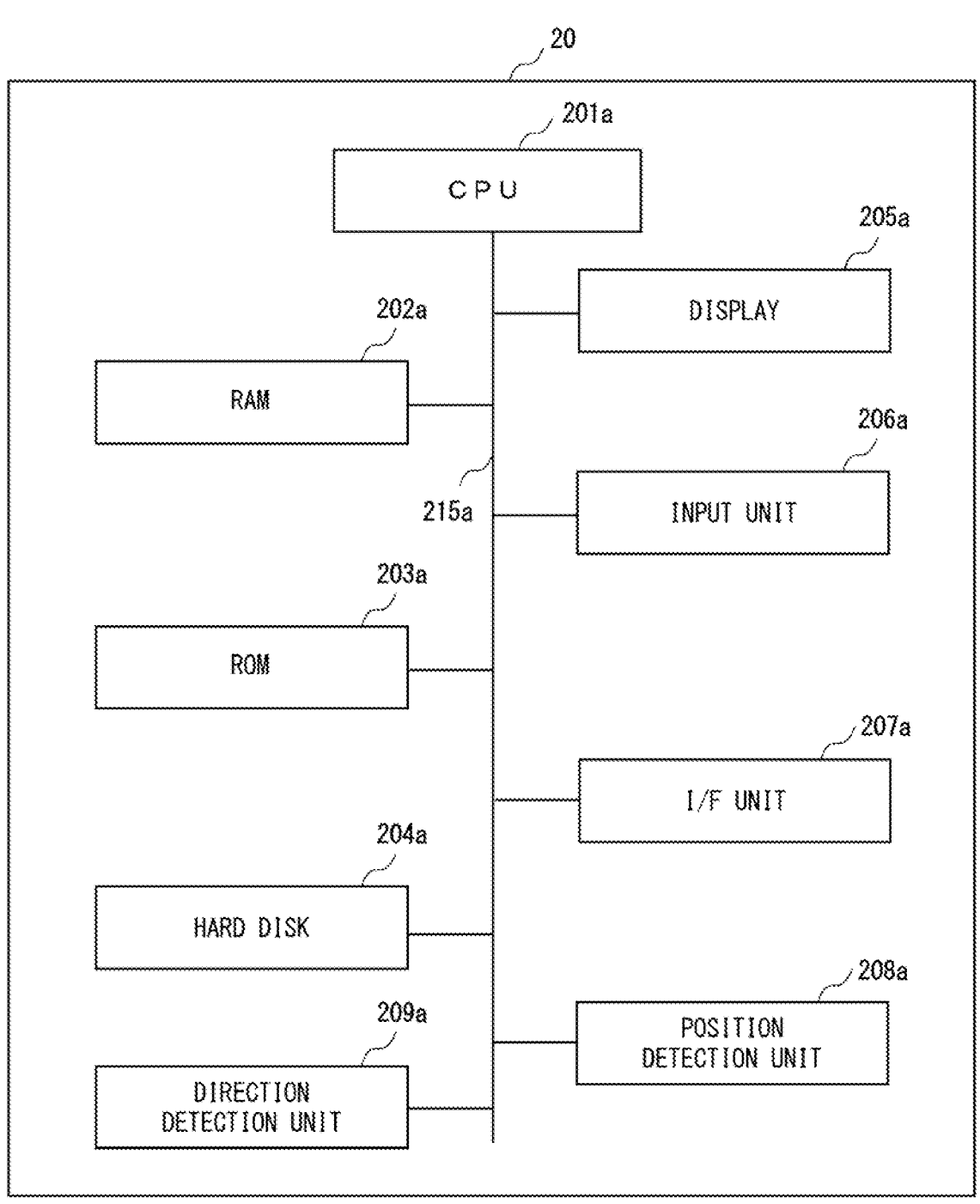
FIG. 6 is a diagram illustrating a hardware configuration example of a user terminal according to the second example embodiment.

FIG. 6 is a block diagram illustrating a hardware configuration example of the user terminal 20 in the present example embodiment. As illustrated in FIG. 6, the user terminal 20 is a computer (information processing apparatus) including a CPU 201*a*, a RAM 202*a*, a ROM 203*a*, and the like. The CPU 201*a* performs calculation and control according to software stored in the RAM 202*a*, the ROM 203*a*, or a hard disk 204*a* (the CPU is also simply referred to as a processor). The RAM 202*a* is used as a temporary storage region when the CPU 201*a* performs various types of processing. The hard disk 204*a* stores an operating system (OS), a registration program to be described later, and the like. A display 205*a* includes a liquid crystal display and a graphic controller, and objects such as images and icons, GUIs, and the like are displayed on the display 205*a*. An input unit 206*a* is an apparatus for a user to give various instructions to the user terminal 20 and is implemented by, for example, a button, a keyboard, a screen keyboard, a mouse, or the like. An interface (I/F) unit 207*a* can control wireless LAN communication and wired LAN communication compatible with a standard such as IEEE 802.11a, and communicates with an external device via the same communication network and the Internet based on a protocol such as TCP/IP. A position detection unit 208*a* includes a global positioning system (GPS) receiver, and can detect a current location and a current time of the user terminal on the earth by receiving a radio waves transmitted by an artificial satellite. A direction detection unit 209*a* includes a 9-axis sensor including a 3-axis acceleration sensor, a 3-axis gyro sensor, a 3-axis bypass sensor, and the like for acquiring a direction of the user terminal. A system bus 215*a* controls data transmission and reception to and from the CPU 201a, the RAM 202a, the ROM 203a, the hard disk 204a, and the like.

Note that the hardware configuration example of the user terminal 20 described above includes the display 205a for displaying video data and image data such as the video AR, but the display 205a does not have to be included in a case of an audio service that provides audio data such as the audio AR. Furthermore, in order to listen to the audio service, an earphone, a headphone, a headset, a hearable device, or the like connected to the I/F (interface) unit 207a of the user terminal in a wired or wireless manner may be used.

Here, a method of reproducing an audio AR content for grouped users, which is one of the characteristic parts of the present disclosure, will be described. A system that provides an audio content to a user terminal based on a user position causes the user terminal to start reproducing the audio content when a walking user has reached a predetermined position (for example, a geofence). A plurality of target users are managed as a group, and in a case where a position of a representative (also referred to as the master user) selected from the plurality of users has reached a specific position (for example, a geofence), control is performed in such a way as to provide the audio content not only to a user terminal of the master user but also to a user terminal of each user of the group.

As a result, it is possible to provide a synchronous audio service to a plurality of users acting in a group. Depending on circumstances, a synchronous audio service can also be provided.

Figure 7:
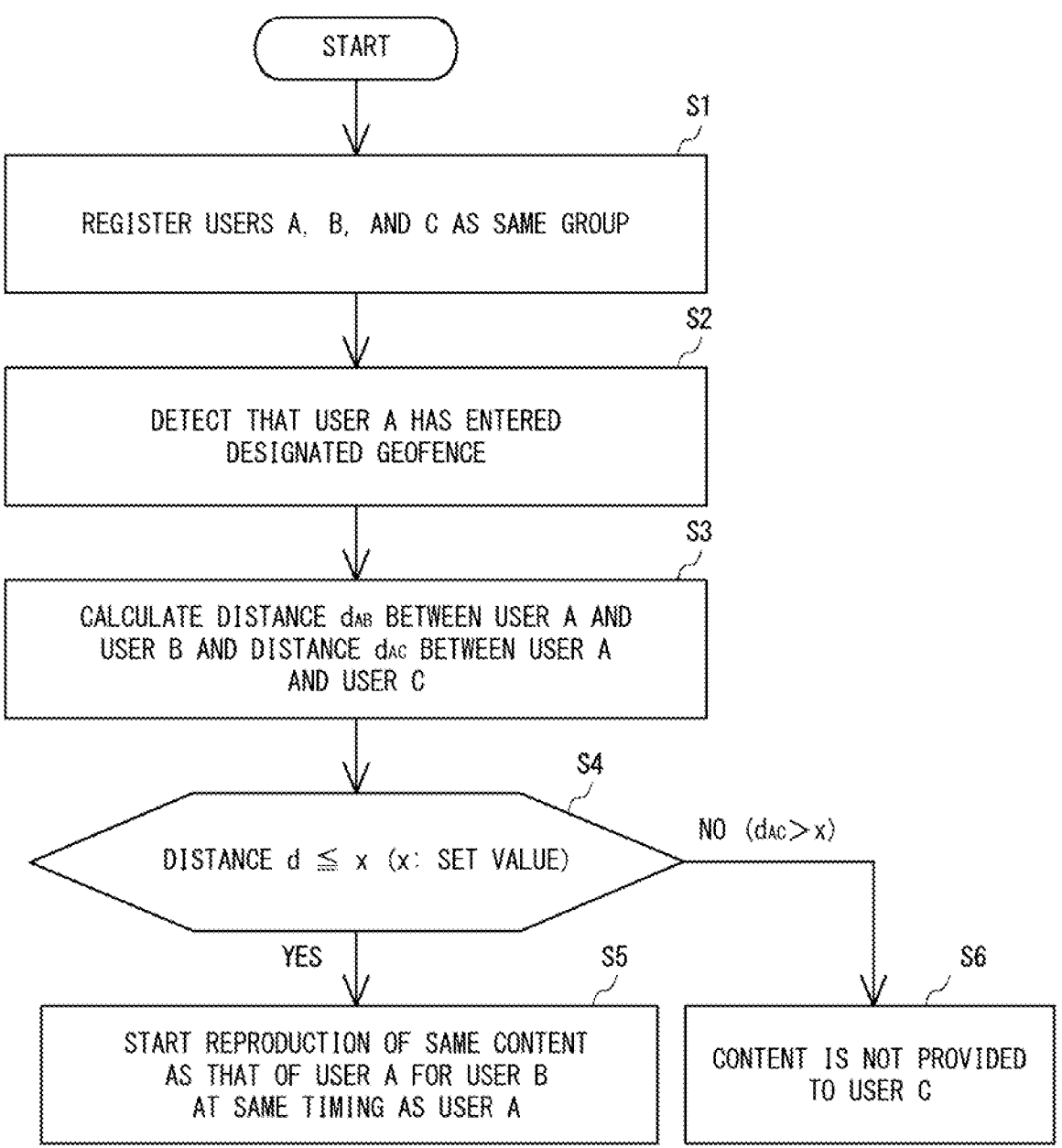
FIG. 7 is a flowchart for describing a content reproduction method for grouped users according to the second example embodiment.

FIG. 7 is a flowchart for describing a content reproduction method for grouped users according to the second example embodiment.

Once a group registration request is received from the user terminal, the registration unit 1011 of the server 10 registers a group associated with each user in the group information database 1024 of the storage unit 102 (Step S1). In this example, users A, B, and C are registered as a group. It is assumed that these grouped users are moving together in a specific area (for example, a sightseeing spot, inside of an art gallery, or the like) or toward a target (for example, a specific facility).

Figure 8:
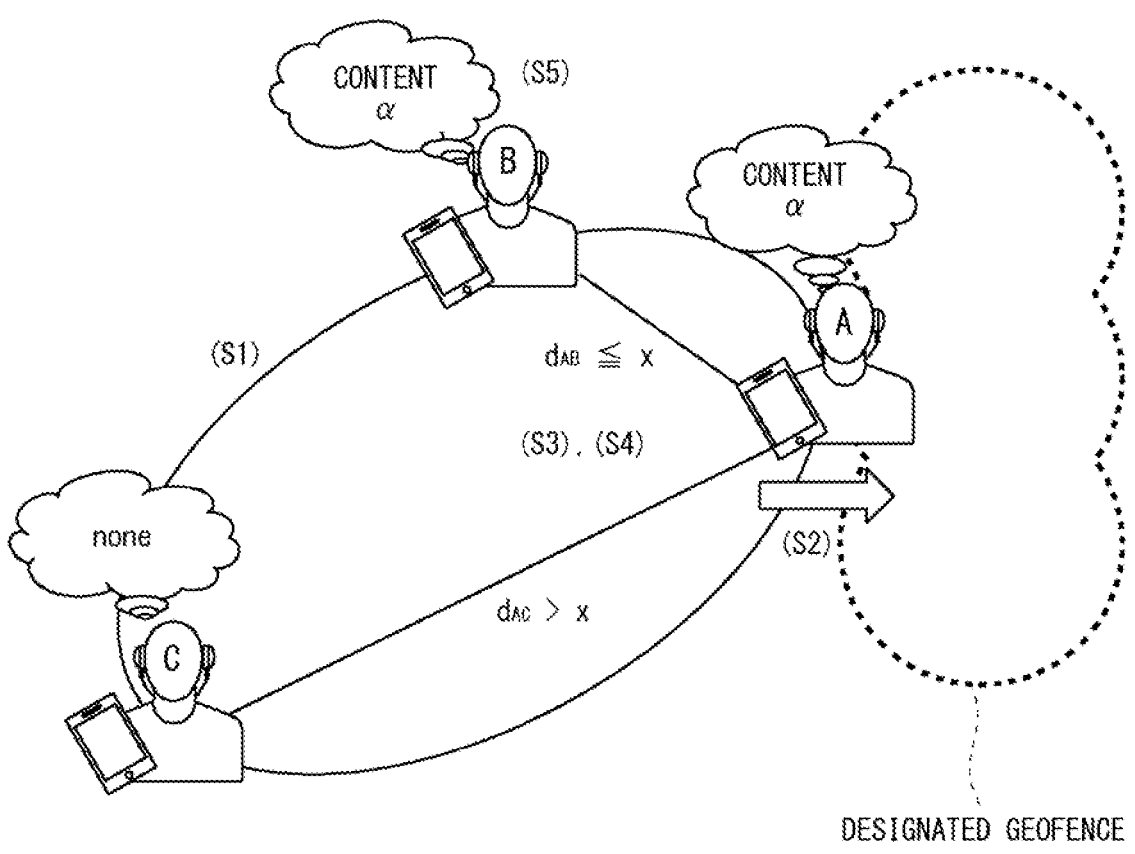
FIG. 8 is a diagram for describing a scene in which a user A at the head among grouped users has entered a designated geofence.

FIG. 8 is a diagram for describing a scene in which the user A at the head among the grouped users has entered a designated geofence. The position information acquisition unit 1012 of the server 10 acquires the position information of the user terminal of each group. As illustrated in FIG. 8, the reaching detection unit 1013 detects that the user A at the head among the grouped users has entered the designated geofence by acquiring the position information of the user terminal 20A (Step S2). The reaching detection unit 1013 may detect the reaching in consideration of an entry condition (an entry direction, an entry angle, or the like) (details will be described later). In this example, the user A at the head is set as the master user. Note that the master user may be arbitrarily set by user's own selection. The position information acquisition unit 1012 of the server 10 can also acquire the position information of other users B and C when the user A has entered the designated geofence.

The distance calculation unit 1014 of the server 10 calculates a distance between the users when the user A has entered the designated geofence, that is, a distance $d_{AB}$ between the user A and the user B and a distance $d_{AC}$ between the user A and the user C (Step S3). There are two methods for calculating the distance. First, a relative distance between the user terminals is calculated from the position information (GPS or the like) of each user terminal.

Second, the distance between the user terminals is calculated from a reception strength of a signal (for example, Bluetooth (registered trademark), WiFi (registered trademark), infrared rays, or the like) transmitted or received by the user terminal. If the reception strength is higher than a threshold, it is estimated that the distance between the user terminals is equal to or less than a predetermined distance (that is, the user terminals are close to each other).

The provision control unit 1015 of the server 10 compares the calculated distance d with a set value x, and controls provision of a content associated with the designated geofence based on the comparison result. Specifically, in a case where the calculated d is equal to or less than the set value x, the provision control unit 1015 provides the content associated with the designated geofence to the user terminal. In a case where $d_{AB} \leq x$ (YES in Step S4), the content associated with the geofence is provided to the user terminal 20A and is also provided to the user terminal 20B at the same time (Step S5). On the other hand, in a case where $d_{AC} > x$ (NO in Step S4), the content associated with the geofence is not provided to the user terminal 20C (Step S6). Note that the set value x can be arbitrarily set, and may be changed for each geofence.

Figure 9:
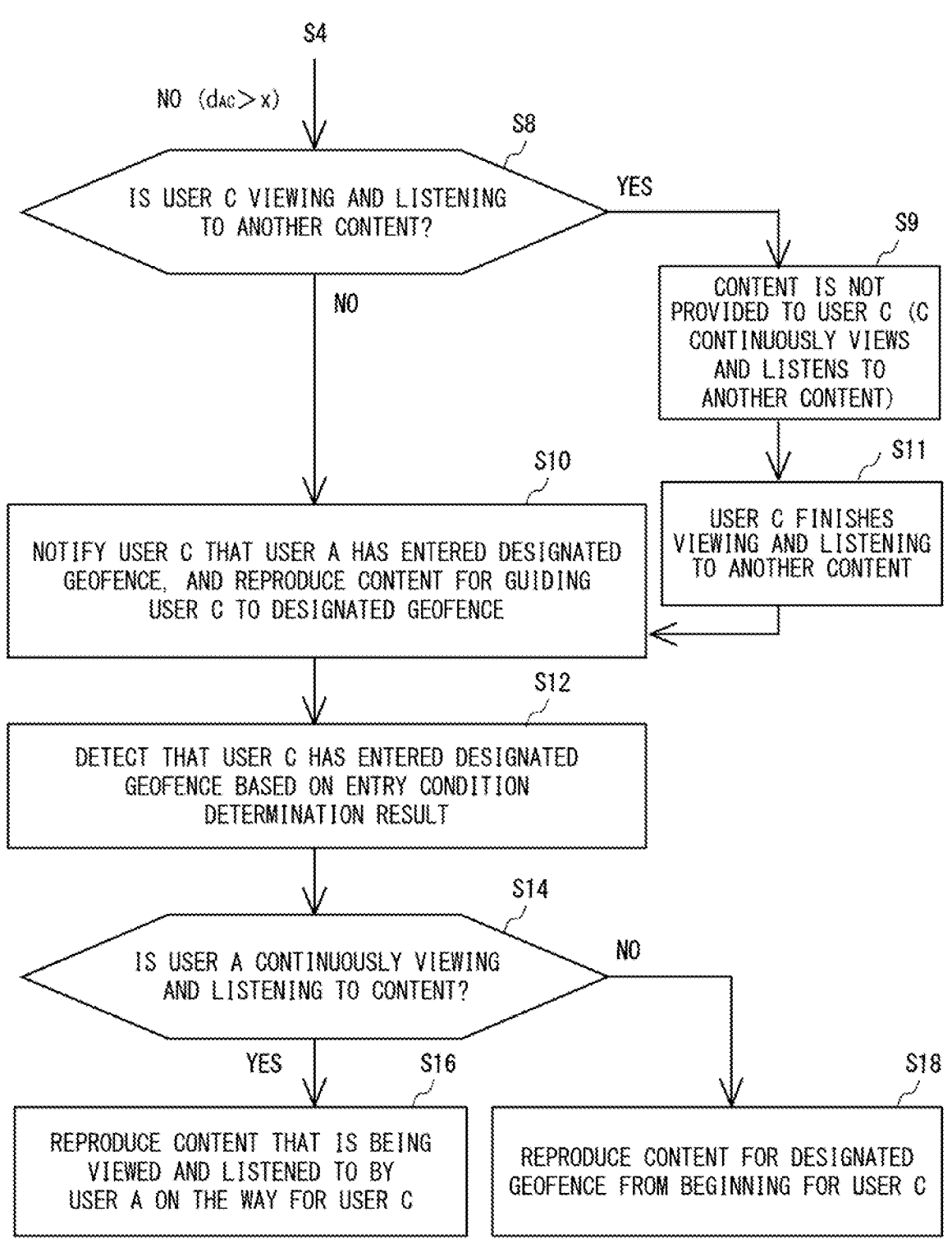
FIG. 9 is a flowchart for describing a content reproduction method for grouped users according to a modified example of the second example embodiment.

FIG. 9 is a flowchart for describing a content reproduction method for grouped users according to a modified example of the second example embodiment. FIG. 9 illustrates processing performed after a negative determination result (NO ($d_{AC} > x$)) is obtained in Step S4 of FIG. 7.

In a case where $d_{AC} > x$ (NO in Step S4), when it is detected that another content is being reproduced by the user terminal 20C (that is, when the user C is viewing and listening to another content) (YES in Step S8), the provision control unit 1015 does not provide the content associated with the designated geofence to the user terminal 20C. For example, in a case where the user C is viewing and listening to another content associated with another geofence, the provision control unit 1015 does not provide, to the user terminal C, the same content as that of the user terminal A, the content being associated with the designated geofence (Step S9). That is, the user C continuously views and listens to another content. Thereafter, when the user C finishes viewing and listening to another content (Step S11), the processing proceeds to Step S10.

On the other hand, in a case where it is not detected that another content is being reproduced by the user terminal 20C (that is, in a case where the user C is not viewing and listening to another content) (NO in Step S8), the provision control unit 1015 notifies the user C that the user A has entered the designated geofence, and reproduces a content for guiding the user C to the designated geofence in the user terminal 20C (Step S10). The content for guiding may be, for example, an audio content or an instruction content on the display. In this way, a user who has fallen behind for a group action can be guided to the group action, and as a result, a synchronous audio service can be provided to the group.

The reaching detection unit 1013 of the server 10 detects that the user C has entered the designated geofence based on an entry condition determination result (Step S12). In a case where the user A is continuously viewing and listening to the content when the user C has entered the designated geofence (YES in Step S14), the provision control unit 1015 reproduces halfway the content (that is, the content associated with the designated geofence) that is being viewed and listened to by the user A in the user terminal 20C. As a result, the user A and the user C can view and listens to a synchronous audio service at the same timing.

In a case where the user A is not continuously viewing and listening to the content when the user C has entered the designated geofence (that is, the user A has already finished viewing and listening to the content) (NO in Step S14), the provision control unit 1015 reproduces the content associated with the designated geofence from the beginning in the user terminal 20C of the user C (Step S18).

In the modified example of the second example embodiment described above, it is possible to prompt the user terminal of the user who has fallen behind for the group action to return to the group action by reproducing another content. Furthermore, it is also possible to provide a synchronous audio service that fits the situation to the user who has returned late for the group action.

FIG. 10 is a table illustrating an example of an audio information list.

The audio information list manages an audio content and provision position information thereof in association with each other. The provision control unit 1015 controls provision of the content information based on such an audio information list. For example, a position A is set to a longitude YA and a latitude XA, and a geofence (region) having a radius of 5 m is set. Furthermore, for the position A, the audio AR is set as the content information. In the audio AR, the volume is five times, the length of the content is 10 s, and content A is set as a file name of the content. Further, an audio content (stereo) is set for each of a position B and a position C.

The provision control unit 1015 can provide the content associated with the position information to the user terminal based on the position information of the user terminal and such an audio information list.

FIG. 11 is a table illustrating an example of a group identification information list.

The group identification information list manages a plurality of pieces of device identification information and common group identification information in association with each other. In FIG. 11, a group X includes devices A to C. It is assumed that a user carrying the device A first reaches the designated geofence. As a result, a master flag indicating that the master device in the group is set for the device A. In addition, the current position information of each device is indicated by a latitude and a longitude. A distance between the device A and another device B or C at the time of reaching is calculated from the current position information of each device. Whether or not to provide a reproduction content to each device is controlled based on the calculated distance. In FIG. 11, a content B is reproduced in the device A that is the master device. Since the calculated distance between the device A and the device B is equal to or less than a threshold, the content B is also provided to the device B. On the other hand, since the calculated distance between the device A and the device B exceeds the threshold, the content is not reproduced in the device C. Note that a function of performing position information transmission and content reproduction based on an instruction under the control of the server 10 for the audio service is installed as an application in the user terminal, and various controls may be performed on the application. In this case, the device identification information may be application identification information associated with an application program installed in the device.

Note that the device C that is not a reproduction target may be excluded from the group X.

In addition, a group Y includes devices D to F. The master flag indicating that the master device is set for the device E. It is assumed that the device E has reached the geofence.

Next, a distance between the device E and another device D or F is calculated. Whether or not to provide a reproduction content to each device is controlled based on the calculated distance. First, a content C is reproduced in the device E that is the master device. As for the device D, since the calculated distance is equal to or less than a threshold, the content C similar to that of the master device is reproduced. Since the distance to the device E exceeds the threshold, another content 13 different from that of the master device is reproduced in the device F.

As described above, the provision control unit 1015 can control provision of the content to each user terminal based on the pieces of position information of the plurality of user terminals registered as the group and the group identification information list.

Next, a geofence setting method will be described in detail.

Figure 12:
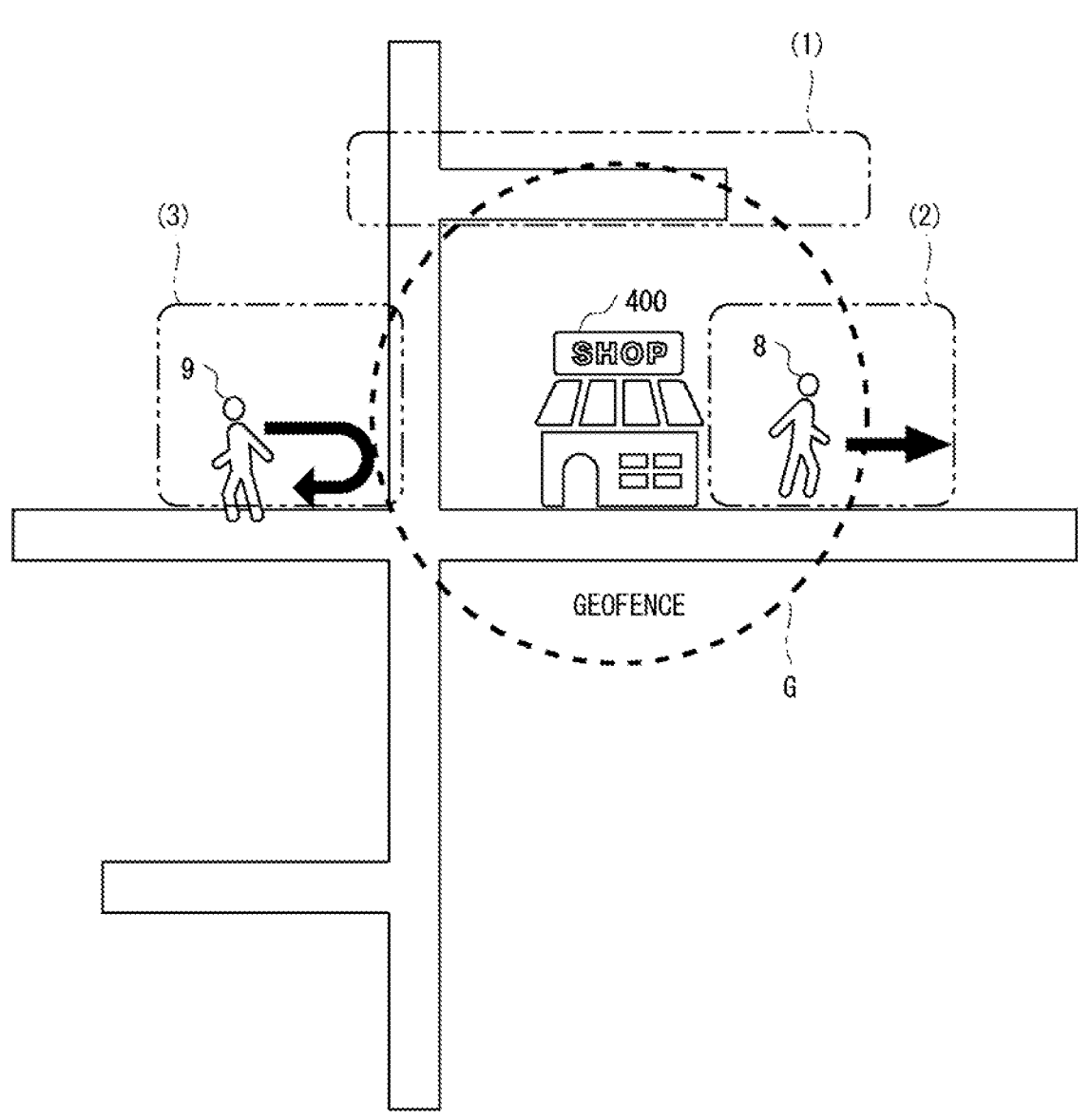
FIG. 12 is a diagram for describing a geofence setting method according to a comparative example and problems thereof.

FIG. 12 is a diagram for describing a geofence setting method according to a comparative example and problems thereof.

Here, a geofence G is set for a facility 400 (for example, a shop).

In this comparative example, the circular geofence G is set around the facility 400. That is, a region having a predetermined radius is set as the geofence around the coordinates (the latitude and the longitude) of the facility 400. In this manner, as the latitude and longitude of the facility and the radius of the geofence are input to the information providing system, the geofence is easily set in such a way that the facility is included in the geofence. When the position detection unit 208 (for example, the GPS receiver) of the user terminal carried by the user detects that the user has entered the geofence G, information regarding the facility 400 (for example, a coupon, event information, or the like) is provided to the user terminal. However, in developing a service for providing audio data to a user terminal, the following three problems occur.

(1) Even in a case of a road that is not included in a route toward the shop, if a partial region of the geofence overlaps the road, the audio service is inappropriately provided to a user who should not be a target. It is difficult to set the radius of the geofence in such a way as to avoid such erroneous detection.

(2) The audio service is inappropriately provided to a user 8 who moves away from the shop.

(3) The audio service is inappropriately provided to a user 9 who has suddenly changed his/her course after entering the geofence.

In addition to the above problems, in particular, in a service using a GPS, a GPS measurement error (about 10 m) cannot be avoided. Therefore, it is necessary to set the geofence in consideration of the measurement error to appropriately provide information.

Figure 13:
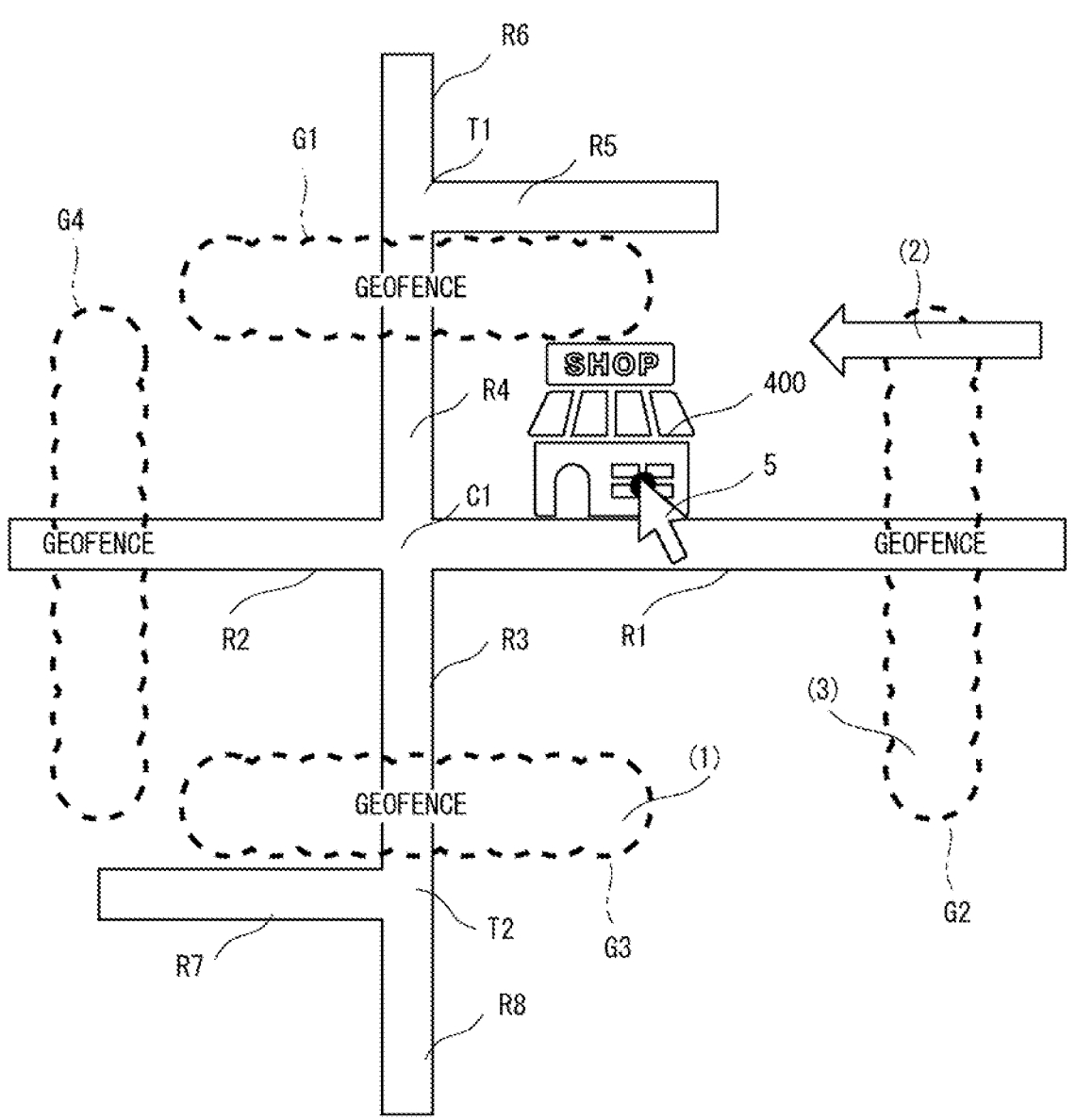
FIG. 13 is a diagram for describing a geofence setting method according to some example embodiments.

FIG. 13 is a diagram for describing an exemplary geofence setting method according to some example embodiments.

In a case of the audio service, when the user has entered the geofence, an audio service (of a predetermined time) related to the shop is provided to the user via the user terminal.

Solutions to the three problems described above are as follows.

(1) Geofences G1, G2, G3, and G4 are arranged at positions separated from the shop by a predetermined distance on a route along which the user arrives at the shop. In order to smoothly guide the user to the shop, it is preferable to cause the user to arrive at the shop almost at the same time as the end of the audio service of the predetermined time.

(2) An entry direction to the geofence is set. As a result, an audio service for a facility on the opposite side to the entry direction to the geofence is not provided. It is possible to prevent the audio service from being provided to a user who moves away from the shop.

(3) When detecting entry to the geofence, it is confirmed that the user has stayed in the geofence for a certain period of time, and then the audio service is provided. As a result, it is possible to prevent the audio service from being provided to a user who has suddenly changed his/her course.

Hereinafter, the solution to each problem will be specifically described.

Figure 14:
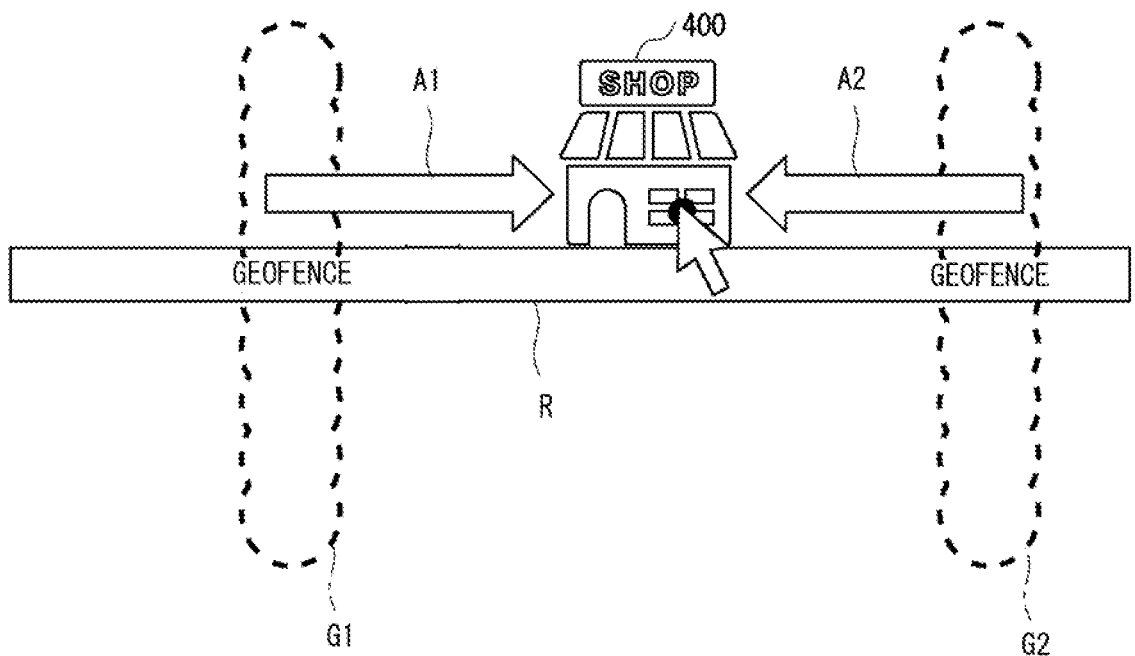
FIG. 14 is a diagram for describing a geofence setting method according to some example embodiments.

FIG. 14 illustrates an example in which geofences G1 and G2 are set in such a way as to be separated from the facility 400 by a predetermined distance.

As illustrated in FIG. 14, one road R extends in a left-right direction in front of the facility 400. It is assumed that a customer of a shop, who is the user, has arrived at the shop through the road R, two geofences G1 and G2 are set at positions separated from the shop by a predetermined distance. Arrows A1 and A2 in FIG. 14 schematically indicate the start and end of the audio service. When it is detected from the position information of the user terminal that the user has entered the geofence, the audio service is started, and the audio service ends just before the user arrives at the shop in accordance with the walking speed of the user. That is, a distance between the shop and the geofence is arbitrarily set in consideration of the predetermined time for which the content such as an audio service is provided and the walking speed of the user. The walking speed may be set in consideration of the age, sex, and the like of the user. The server 10 may dynamically change the distance between the facility (shop) and the geofence in consideration of the age, sex, and the like of the user by acquiring the user ID and the terminal ID. Furthermore, the geofence may be set in such a way as not to overlap with the facility.

Furthermore, as illustrated in FIG. 14, the geofences G1 and G2 are set in such a way as to be elongated in a direction substantially perpendicular to the road. This is to consider the GPS measurement error. Although not illustrated, there are usually many buildings and high-rise buildings along the road. Therefore, it is considered that deviation of the GPS due to reflection of buildings tends to increase in a direction perpendicular to the road.

The elongated shape of the geofence can be a suitable elongated shape including a rectangle, an ellipse, or a combination of a plurality of circles (as described below in FIG. 15). In a case of setting a rectangular geofence, it is sufficient if coordinates (latitude and longitude information) of four points are input.

Note that, in this example, one road extending in the left-right direction with respect to the shop is assumed. However, in a case where the user cannot pass a road on one of the left and right sides due to a dead end or the like, the geofence can be set only on a road on the opposite side.

Figure 15:
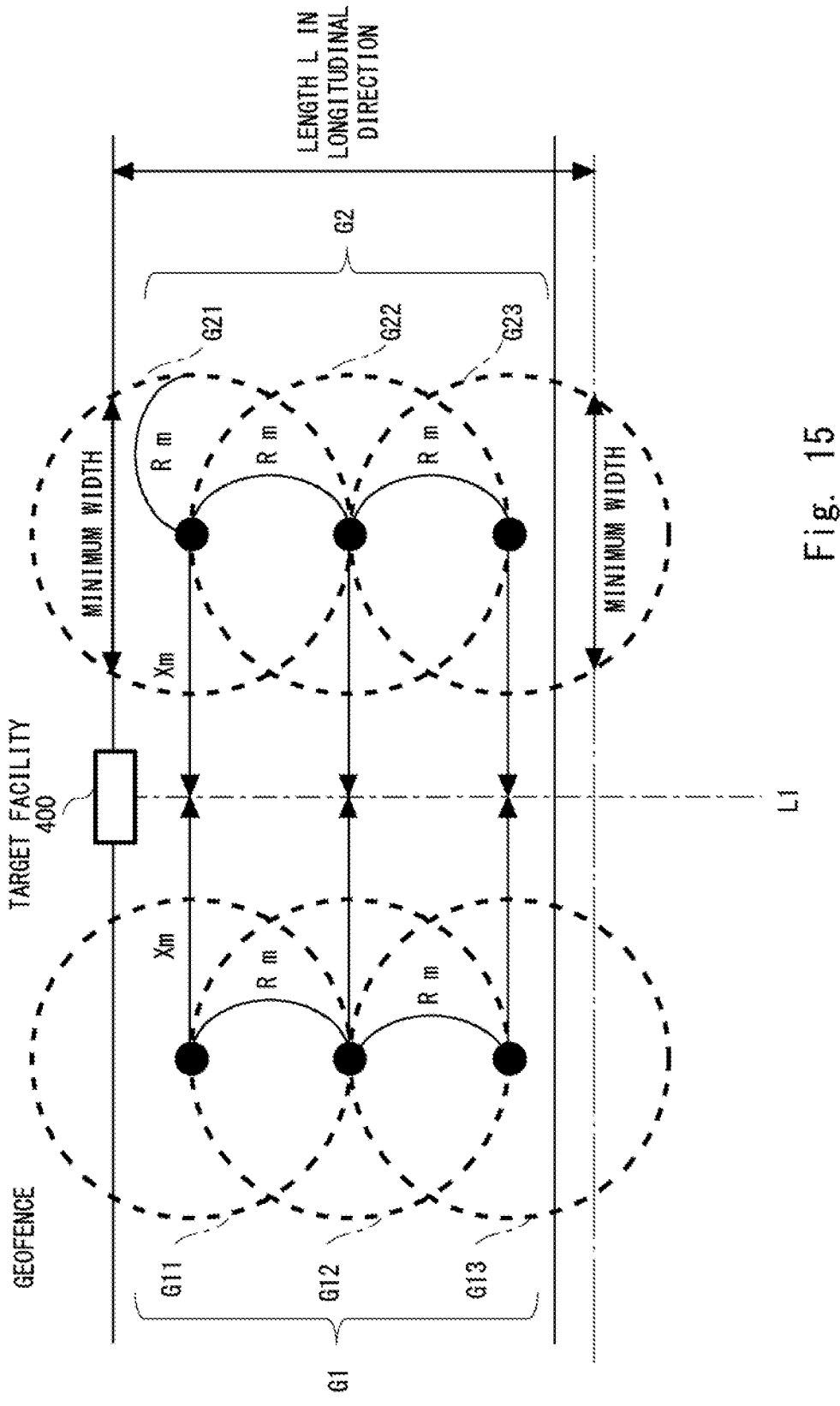
FIG. 15 is a diagram for describing a geofence setting method according to some example embodiments.

FIG. 15 is a detailed diagram of an example of the elongated geofence. In FIG. 15, the geofence is set assuming one road as illustrated in FIG. 14.

A circular geofence G11 having a radius Rm is installed around a position Xm away from a line L1 extending from the target facility 400 in a direction perpendicular to the line L1. A circular geofence G12 having the radius Rm and overlapping with the geofence G11 by the predetermined radius Rm is installed. Furthermore, a circular geofence G13 having the radius Rm and overlapping with the geofence G12 by Rm is installed. In this manner, the plurality of circular geofences G11, G12, and G13 are grouped to form the elongated geofence G1.

Similarly, a plurality of circular geofences G21, G22, and G23 are installed on the opposite side of the line L1 from the plurality of circular geofences G11, G12, and G13. That is, the circular geofence G21 having the radius Rm is installed around a position Xm away from a line L1 extending from the target facility 400 in a direction perpendicular to the line L1. The circular geofence G22 having the radius Rm and overlapping with the geofence G21 by the predetermined radius Rm is installed. Furthermore, the circular geofence G23 having the radius Rm and overlapping with the geofence G22 by Rm is installed. In this manner, the plurality of circular geofences G21, G22, and G23 are grouped to form the elongated geofence G2.

As described above, as the elongated geofence is used, even if an error of the GPS occurs, the content information can be appropriately provided to the user terminal.

In FIG. 15, three circular geofences are grouped as one geofence, but two or more circular geofences may be grouped in consideration of a moving route and a road width of a pedestrian.

In this example, the distance Xm from the facility 400 to the center of the circular geofence is about 15 m, and the radius of the circular geofence is about 3 m. An overlapping portion (the minimum width in FIG. 15) of adjacent circular geofences desirably has a size of 4.5 m or more. A length L of the elongated geofence in a longitudinal direction is 10 m or less. The elongated geofence preferably extends from each of both ends of the road (or walking area) by at least the same length as the road width (or the width of the walking area). Furthermore, in a case where the elongated geofence has a rectangular shape, the length in the longitudinal direction can be 10 m or less, and the width can be 4.5 m or more. Note that the length and width are determined in consideration of the road width, an average walking speed of a pedestrian, a measurement interval of the GPS (about one second interval), a length of the content, and the like, and the present disclosure is not limited thereto.

As described above, for example, the predetermined distance for setting the region is determined based on a reproduction time length of the audio data. Therefore, in a case where the reproduction time length of the audio data has changed due to update of the audio data stored in the content database of the storage unit 102, addition or deletion of a part of the audio data, or the like, the control unit 101 may change the predetermined distance between the facility and the geofence according to the change.

In the above example, one road in front of the shop is assumed to be the walking area. However, regardless of the actual road width, an area (including a sidewalk) in which a pedestrian is assumed to walk can be defined as the walking area, and the geofence can be set corresponding to the walking area. In a case where a pedestrian (user) is assumed to walk in a wide area such as a theme park, for example, a route connecting an entrance of the theme park and an entrance of a ride reserved by the user may be defined as the walking area.

The length L of the elongated geofence in the longitudinal direction can be determined in consideration of the width of the walking area and the GPS measurement error. That is, the length L of the elongated geofence in the longitudinal direction is preferably obtained by adding, to the width of the walking area, a predetermined width for allowing the measurement error from each of both ends of the width of the walking area toward each of both outer sides. In other words, if the GPS measurement error is 10 m, the length L of the elongated geofence in the longitudinal direction is obtained by adding 20 m to the width of the walking area. More preferably, the length L of the elongated geofence in the longitudinal direction may be obtained by adding, to the width of the walking area, the GPS measurement error from each of both ends of the width of the walking area toward each of both outer sides.

Figure 16:
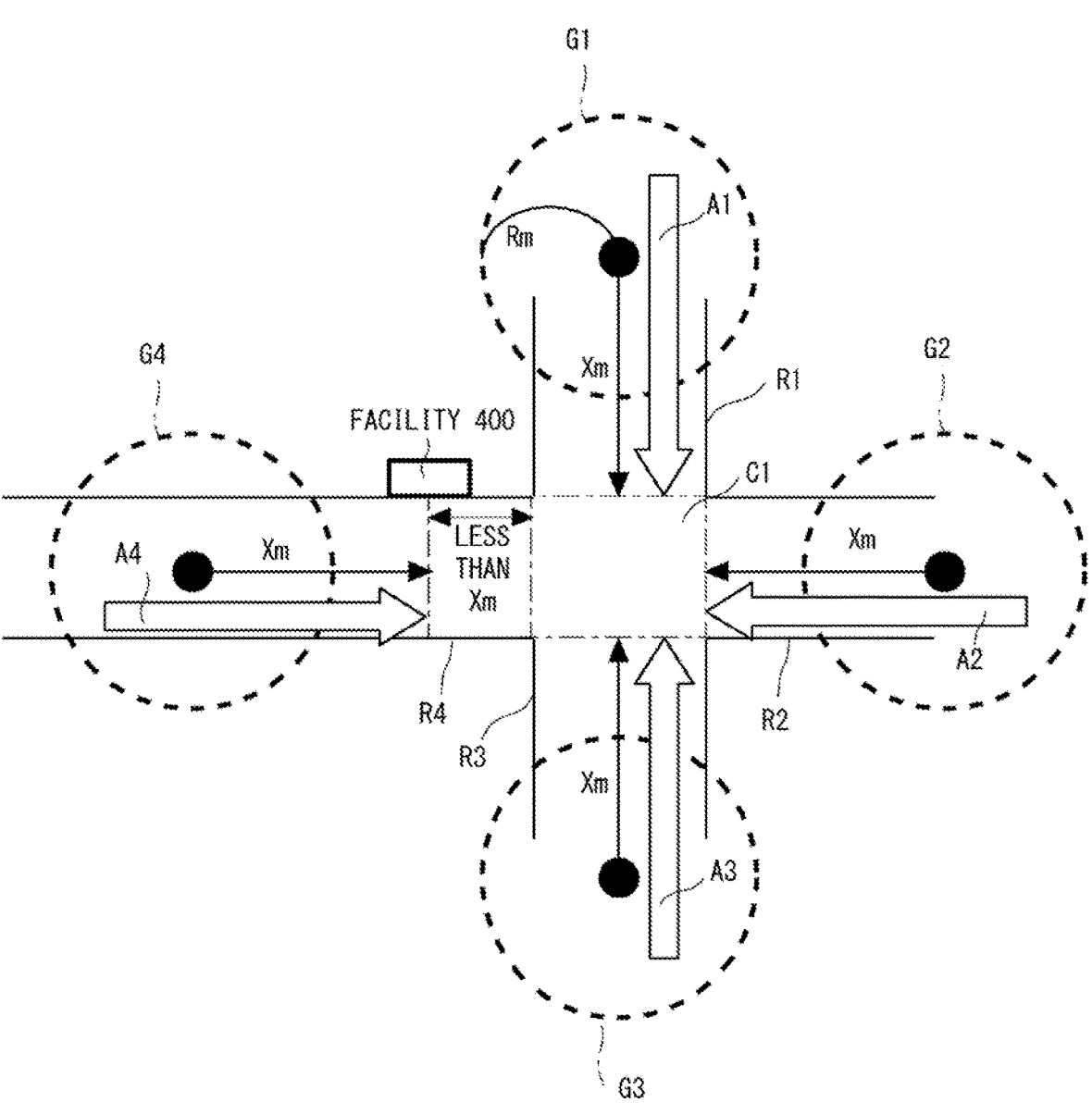
FIG. 16 is a diagram for describing a geofence setting method according to some example embodiments.

FIG. 16 illustrates an example in which geofences G1, G2, G3, and G4 are set on a network of roads R1, R2, R3, and R4 including an intersection C1 while being separated from the facility by predetermined distances. Also in this example, as described above, the geofence is set at a position separated from the target facility 400 by a predetermined distance. However, in a case where the facility is provided along the road R4 in the vicinity of a branch point (within a predetermined distance from the junction) such as an intersection or a T-junction, the geofences are installed on the respective branch roads R1, R2, and R3 (roads separated from the road where the facility is located). That is, as illustrated in FIG. 16, in a case where the facility 400 is at a predetermined distance Xm from the intersection C1, the geofence G2 is installed on the road R2 on the opposite side of the intersection C1 from the facility 400, the geofence G3 is installed on the road R3 located on the right side of the intersection from the facility 400, and the geofence G1 is installed on the road R1 located on the left side of the intersection from the facility 400.

That is, in a case where the route to the facility branches (for example, an intersection or a T-junction), the geofences G1, G2, and G3 are set at positions separated from the branch point by a predetermined distance (Xm). In other words, in a case where the branch point is positioned between the target (facility) and a position corresponding to the predetermined distance on the route, it can be said that the geofence (region) is set at a position corresponding to a second predetermined distance longer than the predetermined distance from the target on the route. The second predetermined distance is set longer than the predetermined distance by a length of a portion of the route that passes through the branch point.

Arrows A1 to A4 in FIG. 16 indicate that a content such as the audio service is being reproduced. As indicated by the arrows A1, A2, and A3, reproduction of the content ends before a user who can approach the facility 400 via the branch point enters the intersection C1. In addition, as indicated by the arrow A4, in a case where the pedestrian walks on the road R4 on which the facility is located, reproduction of the content ends before reaching the facility. In this way, as the geofence is installed at a position before the branch point on the route to the facility and reproduction of the content related to the facility ends before reaching the branch point, it is possible to prevent unnecessary information from being provided to a user who definitely does not move to the facility.

In the information providing system 1, as illustrated in FIG. 13, the geofence may be automatically set appropriately in a manner in which the user positions a cursor 5 on the target facility 400 in the map information displayed on the display and clicks the mouse.

Note that, in FIG. 16, the circular geofences G1 to G4 are used for convenience of description. However, as described above, as the geofences G1 to G4 elongated in a direction substantially perpendicular to the road are formed, it is possible to cover the GPS measurement error.

Next, a method of setting the entry direction to the geofence will be described with reference to FIG. 17.

Figure 17:
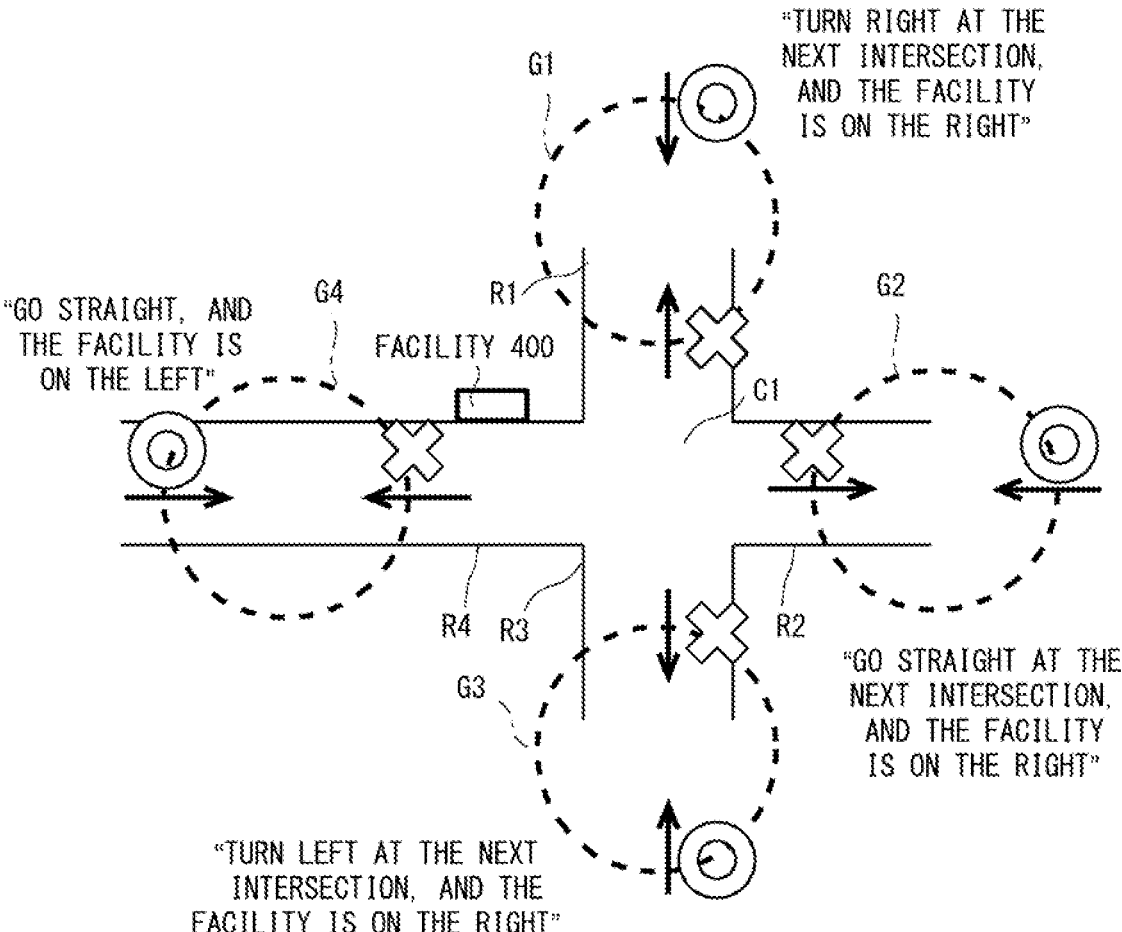
FIG. 17 is a diagram for describing a method of setting an entry direction to a geofence.

In FIG. 17, a circular geofence is illustrated in order to simplify the drawing, but an elongated geofence extending from a road width may be used as described above.

As illustrated in FIG. 17, for each of geofences G1 to G4, a direction toward the facility 400 (that is, a direction toward the intersection C1) is set as the entry direction (indicated by a mark "o" in FIG. 17). Therefore, the audio service is provided to a user terminal of a user who has entered from the entry direction. The content of the audio service related to the facility 400 may be determined to be different for each geofence. For example, the audio service reproduced when the user enters the geofence G1 may announce "Turn right at the next intersection, and the facility is on the right". The audio service reproduced when the user enters the geofence G2 may announce "Go straight at the next intersection, and the facility is on the right". The audio service reproduced when the user enters the geofence G3 may announce "Turn left at the next intersection, and the facility is on the right". Further, the audio service reproduced when the user enters the geofence G4 may announce "Go straight, and the facility is on the left".

On the other hand, a direction away from the facility 400 (that is, a direction away from the intersection C1) is set as a non-entry direction (indicated by X in FIG. 17), and the audio service is not provided to a user who has entered from the non-entry direction.

Figure 18:
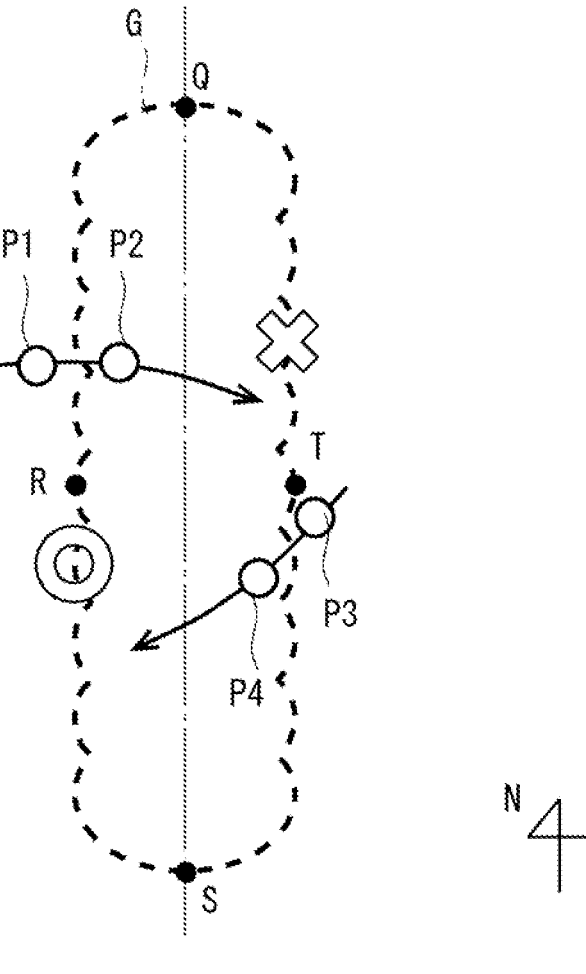
FIG. 18 is a diagram for describing a method of determining an entry direction to a geofence.

FIG. 18 is a diagram for describing a method of determining the entry direction of the user to the geofence.

Although this information providing system is described under the assumption that the GPS measurement interval is about one second, but the GPS measurement interval may be set to an arbitrary measurement interval.

It is assumed that the user carrying the user terminal has moved from a position P1 to a position P2 according to the GPS when entering the geofence G. In this case, an entry angle θ from the position P1 to the position P2 is calculated based on a predetermined direction (the north direction in this example). In a case where the calculated entry angle is within a predetermined angle threshold, for example, 180 degrees <θ<360 degrees, the user can be regarded to have entered the geofence from an appropriate entry direction (indicated by a circle in FIG. 18).

On the other hand, it is assumed that the user carrying the user terminal has moved from a position P3 to a position P4 at the GPS measurement interval (about one second) when entering the geofence G. In this case, an entry angle θ from the position P3 to the position P4 is calculated based on a predetermined direction (the north direction in this example). In a case where the entry angle is within a predetermined angle threshold, for example, 0 degrees <θ<180 degrees, the user can be regarded to have entered the geofence from an inappropriate entry direction (the non-entry direction indicated by X in FIG. 18).

Alternatively, as a modified example, the entry direction of the user may be determined as follows. First, as illustrated in FIG. 18, a part QRS of a boundary line of the geofence G is defined as an entry boundary line, and a part QTS of the boundary line of the geofence G is defined as a non-entry boundary line.

It is assumed that the user carrying the user terminal has moved from the position P1 to the position P2 at the GPS measurement interval (about one second) when entering the geofence G. In this case, since the user has entered across the entry boundary line QRS of the geofence G, the control unit 101 can determine that the user has entered from a predetermined entry direction for the geofence. In this case, the content information is provided.

On the other hand, it is assumed that the user carrying the user terminal has moved from a position P3 to a position P4 at the GPS measurement interval (about one second) when entering the geofence G. In this case, since the user has entered across the non-entry boundary line QTS of the geofence G, the control unit 101 can determine that the user has entered from the non-entry direction determined for the geofence. In this case, the content information is not provided.

Figure 19:
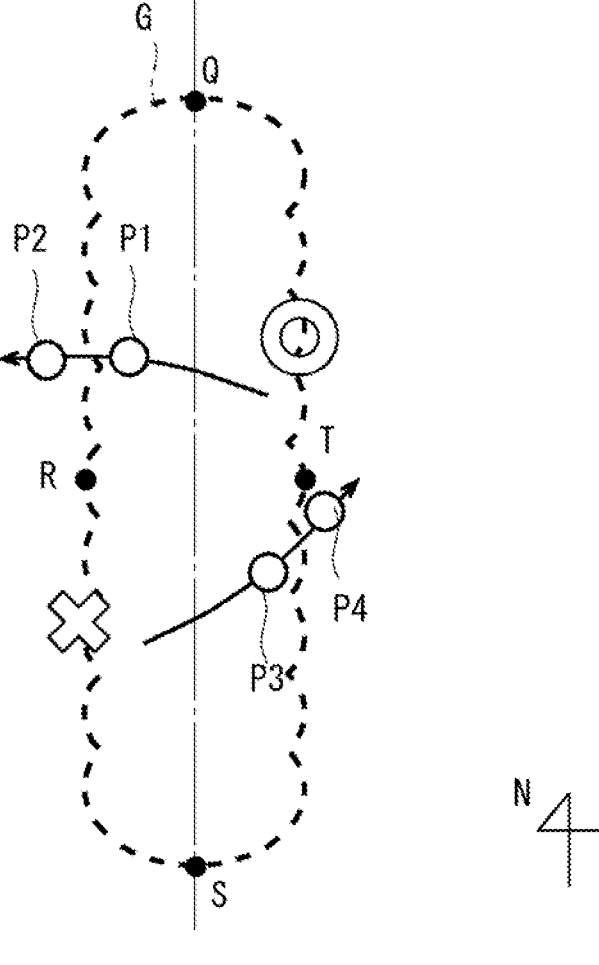
FIG. 19 is a diagram for describing a method of determining an exit direction from a geofence.

FIG. 19 is a diagram for describing a method of determining an exit direction of the user from the geofence.

Next, it is assumed that the user carrying the user terminal has moved from the position P1 to the position P2 according to the GPS when exiting from the inside to the outside of the geofence G. An exit angle θ from the position P1 to the position P2 is calculated based on a predetermined direction (the north direction in this example). In a case where the calculated exit angle is outside an exit angle threshold (for example, 180 degrees <θ<360 degrees), the user can be regarded to have exited the geofence in an inappropriate exit direction (a non-exit direction indicated by X in FIG. 19). In this case, the content information is not provided.

On the other hand, it is assumed that the user carrying the user terminal has moved from the position P3 to the position P4 at the GPS measurement interval (about one second) when exiting from the inside to the outside of the geofence G. In this case, an exit angle θ from the position P3 to the position P4 is calculated based on a predetermined direction (the north direction in this example). In a case where the entry angle is outside an exit angle threshold (for example, 0 degrees <θ<180 degrees), the user can be regarded to have exited the geofence in an appropriate exit direction (indicated by a circle in FIG. 19). In this case, the content information is provided.

As described above, the content provider can set the predetermined entry angle threshold and the predetermined exit angle threshold for the geofence. The control unit 101 of the server 10 can continuously receive the position information from the user terminal 20, calculate the entry angle to the geofence and the exit angle from the geofence, and determine an appropriate entry direction and an appropriate exit direction. As a result, the provision control unit 1015 of the server 10 can provide appropriate content information to the user terminal 20.

Note that, in the above example, the entry direction is determined from measurement values at two points of the measurement interval before and after entry to the geofence, but the entry direction may also be determined from measurement values at two or more points, for example, three or four points.

FIG. 20 is a table illustrating an adjustment value for each time zone.

As illustrated in FIG. 20, an arbitrary adjustment value is set for each time zone. Adjustment values (a to e of FIG. 20) can take arbitrary values. The adjustment value may be zero. The time acquisition unit 1018 of the control unit 101 acquires a time (for example, 10:20) at which the position information from the user terminal 20 has entered the geofence. The control unit 101 acquires an adjustment value (for example, b) of a time zone (for example, 7:00 to 11:00) corresponding to the acquired time. The adjustment unit 1014 of the control unit 101 adjusts the entry angle threshold by multiplying the entry angle threshold by the adjustment value. The degree of congestion of the road on which the geofence is set changes for each time zone. For example, in a situation where the user can walk relatively linearly (for example, the road is clear), the adjustment value may be set in such a way that the angle threshold decreases. On the other hand, in a situation where the user is likely to meander (for example, the road is congested), the adjustment value may be set in such a way that the angle threshold increases.

In the above example, the entry angle threshold is multiplied by the adjustment value, but the adjustment value (positive or negative value) may also be added to the entry angle threshold. The adjustment value can also be used for the exit angle threshold as well as for the entry angle threshold. The adjustment value may be different between for the entry angle threshold and for the exit angle threshold.

Note that the time zone illustrated in FIG. 20 is merely an example, and can be arbitrarily set.

As a modified example, the control unit 101 may acquire the accuracy of the GPS and perform control in such a way as to increase the adjustment value or the angle threshold in a case where the accuracy of the GPS is lower than an accuracy threshold.

As another modified example, the control unit 101 of the server 10 may acquire a schedule of the user from a calendar application of the user terminal 20, and change the adjustment value for the angle threshold according to the acquired schedule of the user. For example, if there is a schedule, the adjustment value may be increased.

In a case where only the entry direction is determined, the audio service is inappropriately provided to a user who has suddenly changed his/her course after entering the geofence. Therefore, a method for solving this problem will be described.

A method of determining a moving direction after entry will be described with reference to FIG. 21.

After detecting that the user has entered the geofence from a predetermined entry direction, the control unit 101 further receives continuous GPS measurement values (at least two measurement values) at the GPS measurement interval. As a result, it is possible to determine the moving direction of the user after the user enters the geofence.

Figure 21:
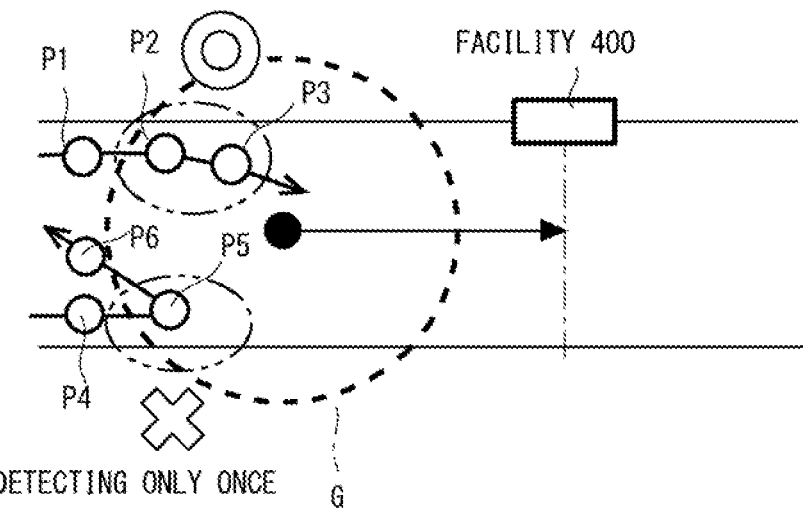
FIG. 21 is a diagram for describing a method of determining a movement direction after entering a geofence.

For example, as illustrated in FIG. 21, after positions P1 and P2 of the user are measured at the GPS measurement interval, in a case where it is further detected that the next position P3 is within the geofence G, the provision control unit 1015 of the server 10 provides the audio service to the user terminal. In other words, in a case where the user stays in the geofence G for a predetermined time (about two seconds in this example) or more, the provision control unit 1015 of the server 10 provides the audio service.

On the other hand, after positions P4 and P5 of the user are measured by the GPS, in a case where it is further detected that the next position P6 is outside the geofence G, the control unit 101 of the server 10 does not provide the audio service to the user terminal. As a result, the control unit 101 of the server 10 can prevent the content from being distributed to the user terminal in a case where the position of the user terminal temporarily erroneously enters the geofence.

Note that, in the above example, measurement values of two points are measured when determining the moving direction after the entry, but the content may be reproduced after three or more points in the geofence are measured. Furthermore, an interval from immediately after the determination to a voice output start time can be appropriately adjusted according to a distance between the geofence and the target facility and a reproduction time of the content. As described above, the provision control unit 1015 may determine that the user has entered the region (geofence) after a predetermined time has elapsed from the entry of the user to the region. Alternatively, after the user enters the region (geofence), the provision control unit 1015 may determine that the user has entered the region after the user further advances from an entry position on a boundary of the region by a predetermined distance.

Figure 22:
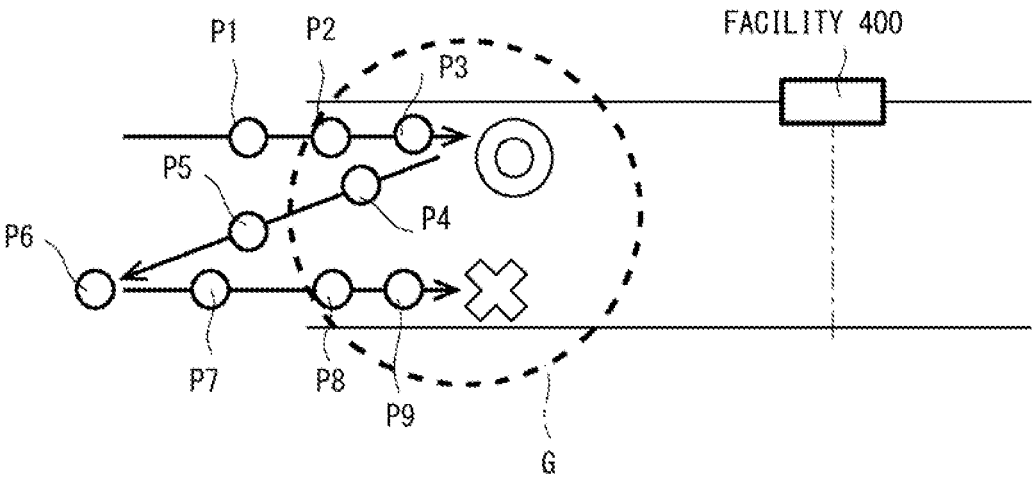
FIG. 22 is a diagram for describing an example in which a content is not distributed at the time of re-entry to a geofence.

Furthermore, the content once distributed to the user who has entered the geofence does not have to be distributed to the same user even if the user enters the geofence again. Specifically, as illustrated in FIG. 22, the content associated with the facility 400 is reproduced after a position P1 outside the geofence and positions P2 and P3 inside the geofence are measured. It is assumed that the user then moves to positions P5, P6, and P7 outside the geofence through a position P4 in the geofence, and moves to positions P8 and P9 in the geofence again. In this case, the information processing apparatus can prevent the same content from being distributed again to a user to whom the content has once been distributed within a predetermined time.

The control unit 101 of the server 10 can store the provided content information in the history information database 1027 of the storage unit 102 as history information in association with the user identification information and the geofence identification information.

Specifically, a reproduction/non-reproduction flag is provided for audio information for the audio AR (content information). In the information processing apparatus (the user terminal or the cloud-side server), a predetermined time (for example, one hour) for a flag indicating that reproduction has been performed is set for the audio information for the audio AR output from the user terminal. When the user enters the geofence, the information processing apparatus confirms the user ID or the terminal ID, and also confirms the presence or absence of the flag for the audio information for the audio AR corresponding to the geofence ID. Then, the information processing apparatus does not reproduce the content in the user terminal in a case where the flag is present, and reproduces the content in the user terminal in a case where there is no flag. In this manner, the storage unit 102 can further store the history information including a user terminal group and whether or not information regarding the target has been transmitted, and the control unit 101 can transmit the information regarding the target to the user terminal 20 based on the history information. The storage unit 102 can further store a transmission time of the information regarding the target, and the control unit can transmit the information regarding the target based on the transmission time.

Furthermore, the provision control unit 1015 of the server 10 may change the type of content associated with the same geofence based on the history information of a passage route of the user. In this case, the content is changed based on the history information of the passage route of the user indicating a route through which the user has passed, regardless of whether or not the content has been reproduced.

The server 10 further includes a history information storage unit (history information database 1027) that stores the identification information of the user terminal, pieces of identification information of the plurality of regions, and pieces of position information of the user terminal in the plurality of regions as the history information regarding the passage route of the user in association with each other, and the provision control unit 1015 changes the content information based on the history information. FIG. 23 is a diagram illustrating an example of changing the type of content associated with the same geofence. For example, as illustrated in FIG. 23, in a case where the user has entered a geofence G3 after passing through a geofence G1 in advance, the provision control unit 1015 of the server 10 may provide a content A. On the other hand, in a case where the user has entered the geofence G3 after passing through a geofence G2 in advance, the control unit 101 of the server 10 may provide a content B. In this manner, as the geofence through which the user has passed in the past is stored as the history information, it is possible to more flexibly provide the content service to the user.

Furthermore, the provision control unit 1015 of the server 10 may change the type of content associated with the same geofence based on the history information of the passage route of the user and the provided content.

The server 10 further includes the history information storage unit (history information database 1027) that stores the identification information of the user terminal, the pieces of identification information of the plurality of regions, the pieces of position information of the user in the plurality of regions, and the content information provided regarding the plurality of regions in association with each other as the history information regarding the passage route of the user and the provided content. The provision control unit 1015 changes the content information based on the history information in the history information storage unit.

Figure 24:
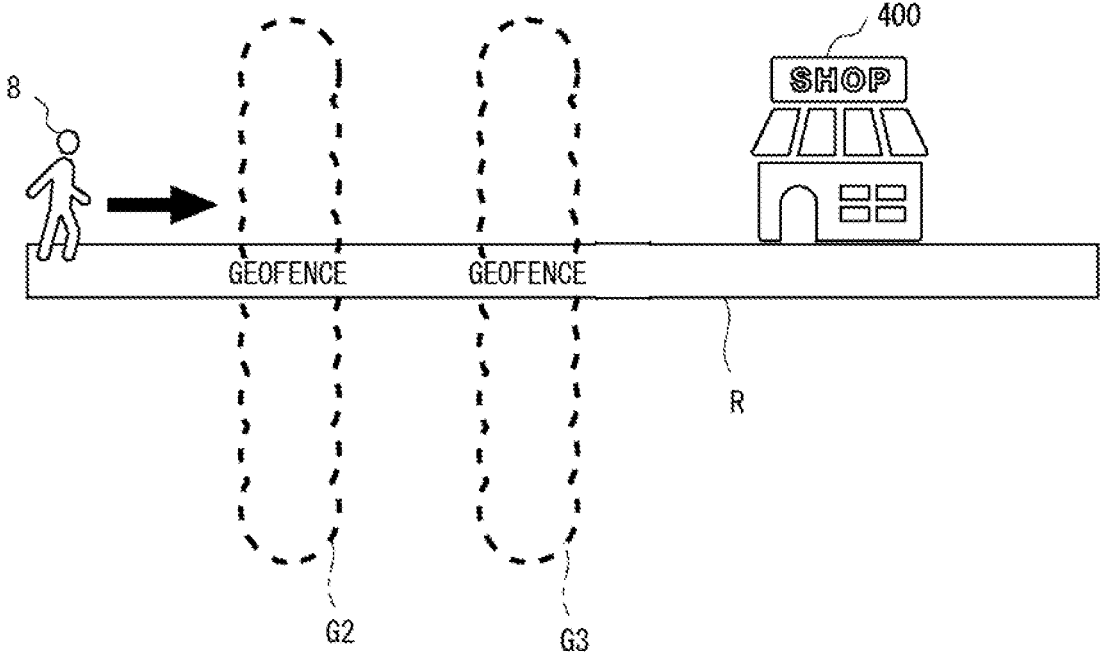
FIG. 24 is a diagram for describing an example of a plurality of geofences associated with a facility.

FIG. 24 is a diagram for describing an example of a plurality of geofences associated with a facility. FIG. 25 is a diagram illustrating an example of changing the type of content associated with the same geofence.

In FIG. 24, a plurality of geofences G2 and G3 are arranged at a predetermined interval on the route to the facility 400 by the user 8. For example, as illustrated in FIG. 25, in a case where the user has entered the geofence G3 at an angle within the angle threshold after entering the geofence G2 at an angle outside the angle threshold in advance and passing through the geofence G2 without being provided with the content associated with the geofence G2, the provision control unit 1015 of the server 10 may provide a content C. On the other hand, in a case where the user has entered the geofence G3 at an angle within the angle threshold after entering the geofence G2 at an angle within the angle threshold in advance and passing through the geofence G2 while being provided with the content associated with the geofence G2, the provision control unit 1015 of the server 10 may provide a content D. For example, the content C can be a more satisfactory content related to the target than the content D. In this manner, as a geofence through which the user has passed in the past and whether or not a content associated with the geofence has been reproduced are stored as the history information, the content service can be more flexibly provided to the user.

Third Example Embodiment

Figure 26:
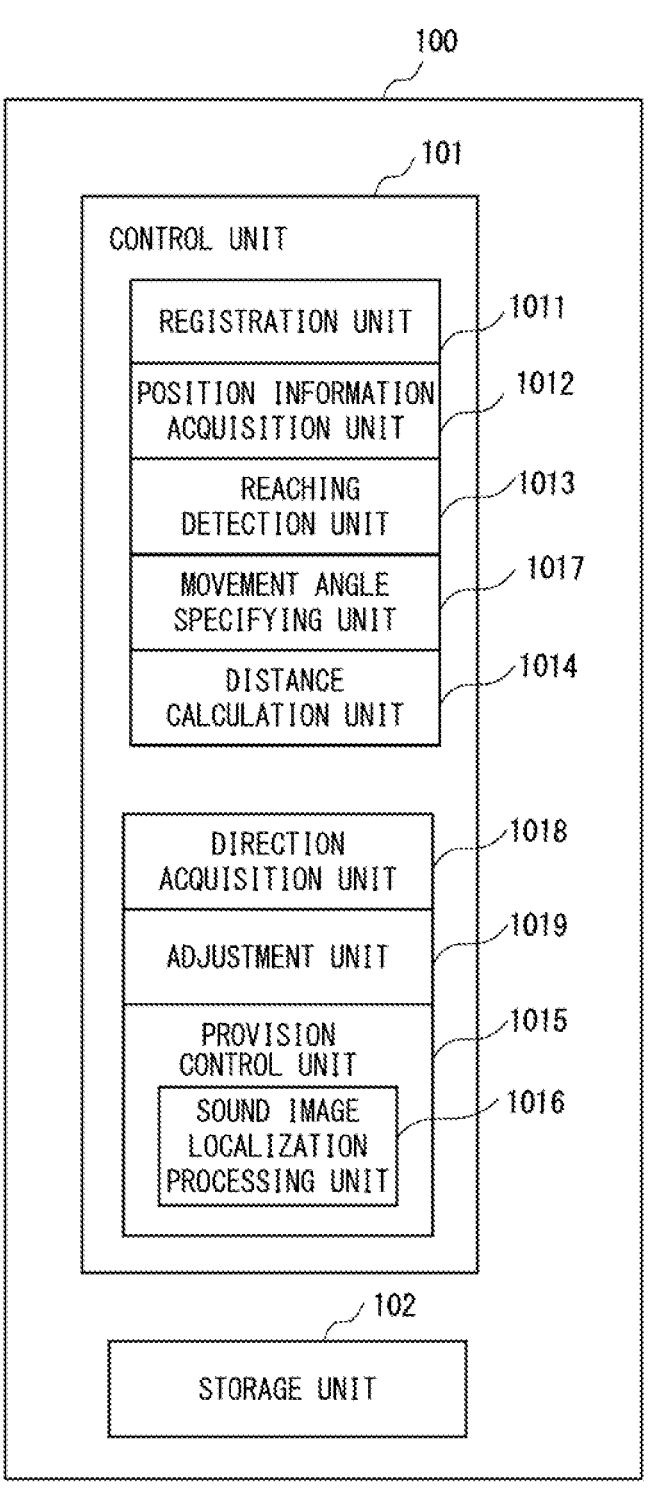
FIG. 26 is a diagram for describing a configuration example of an information providing apparatus according to a third example embodiment.

FIG. 26 is a diagram for describing a configuration example of an information providing apparatus according to a third example embodiment. In FIG. 26, the same components as those in the first example embodiment are denoted by the same reference signs as those in FIG. 1, and a description thereof will be omitted as appropriate.

An information providing apparatus 100 according to the present example embodiment includes a control unit 101 and a storage unit 102. The information providing apparatus 100 can be implemented by a computer including a processor such as a central processing unit (CPU), a memory, an interface circuit, and the like. The storage unit 102 stores region designation information that designates a region set on a route to a target, an angle threshold which is an entry angle threshold or an exit angle threshold set for the region, and content information regarding the target in association with each other.

The target is not limited to a building, a facility, or a shop, and may include various objects such as a sign, a signboard, a mannequin, a mascot doll, an animal, or a firework. The storage unit 102 stores position information (for example, a latitude and a longitude) of the target. The route to the target is a route through which a pedestrian passes before reaching the target, and is not limited to a route with the shortest estimated arrival time, and may include various routes through which the pedestrian can pass. The region is an area surrounded by a virtual fence (boundary line) provided on the map. The region designation information may include information that designates a latitude, longitude, a size, a radius, and the like for designating the region on the map data. The angle threshold can include the entry angle threshold and exit angle threshold set for the region. The content information regarding the target may include information regarding a sign, a signboard, a mannequin, a mascot doll, an animal, a firework, and the like, event information of a facility, coupon information, road guidance (displayed on a display or an audio service), traffic information (traffic jam and accident information), tourism information, a video, audio augmented reality (AR), and the like.

The control unit 101 includes a registration unit 1011, a position information acquisition unit 1012, a movement angle specifying unit 1017, a reaching detection unit 1013, a distance calculation unit 1014, a direction acquisition unit 1018, an adjustment unit 1019, a provision control unit 1015, and a sound image localization processing unit 1016. The registration unit 1011 receives a group registration request from the user terminal 20, and registers a group in which a plurality of users and a plurality of user terminals are associated with each other in a group information database 1024 of the storage unit 102. Identification information that uniquely identifies a group is assigned to each group, and a plurality of user IDs, a plurality of user terminal IDs, and the like are collectively managed.

The position information acquisition unit 1012 acquires position information of the user terminal(s) possessed by the user. The movement angle specifying unit 1017 specifies a movement angle indicating an angle at which the user enters the region or an angle at which the user exits the region by using the position information of the user terminal. The adjustment unit 1019 adjusts the angle threshold in a case where a predetermined condition is satisfied. The reaching detection unit 1013 can detect that the user has reached the region based on the position information of the region and the position information of the user terminal. In a case where the reaching is detected, the provision control unit 1015 controls provision of the content information based on a comparison result (that is, the entry condition) obtained by comparing the specified movement angle with the adjusted angle threshold.

In a case where the reaching is detected and the entry condition is satisfied, the distance calculation unit 1014 calculates a distance between the user terminals from the position information of each user terminal. In a case where the reaching is detected, the provision control unit 1015 provides the content information to the first user terminal. The provision control unit 1015 controls provision of the content to another user terminal based on the calculated distance of each user terminal when the reaching is detected.

The control unit 101 according to the third example embodiment further includes the direction acquisition unit 1018 that acquires the direction of the user terminal. As described above, the user terminal 20 includes the direction detection unit 209a, can periodically acquire the direction of the user terminal 20, and can transmit the acquired direction to the direction acquisition unit 1018 of the server 10. The control unit 101 can determine a walking characteristic of the user from a change of the direction of the user terminal acquired by the direction acquisition unit 1018 and the position information of the user terminal acquired by the position information acquisition unit 1012. For example, in a case where it is determined that the user is walking substantially linearly, the adjustment unit 1019 may perform adjustment in such a way as to decrease the entry angle threshold or the exit angle threshold. Alternatively, in a case where it is determined that the user is walking while substantially meandering, the adjustment unit 1019 may perform adjustment in such a way as to increase the entry angle threshold or the exit angle threshold. The provision control unit 1015 according to the present example embodiment further includes the sound image localization processing unit 1016. The sound image localization processing unit 1016 performs sound image localization processing on the content information.

The direction acquisition unit 1018 can acquire the direction of the user terminal 20 when the user enters the region or exits the region. As described above, the user terminal 20 includes the direction detection unit 209a that detects the direction of the user terminal, can periodically acquire the direction of the user terminal 20, and can transmit the acquired direction to the direction acquisition unit 1018 of the server 10.

The provision control unit 1015 controls provision of the content information based on the acquired direction of the user terminal and a comparison result obtained by comparing the specified movement angle with the adjusted angle threshold. For example, even if the entry angle when the user has entered the geofence is within the entry angle threshold, in a case where the user terminal 20 is directed in a direction different from a moving direction, audio information that is not subjected to the sound image localization processing by the sound image localization processing unit 1016 may be output, or the provision control unit 1015 does not have to provide the content itself. In particular, in a case where a hearable device that can be worn on the head by the user is used as the user terminal, an orientation of the face of the user can also be acquired. When the user's face is facing down and is facing a side different from the moving direction, the provision control unit 1015 does not have to provide the content.

The sound image localization processing unit 1016 of the provision control unit 1015 performs the sound image localization processing on a sound content to be output according to the position of the target and posture information (that is, the direction of the user terminal) of the user. The sound image localization processing performed in the audio AR is to generate audio information obtained by performing sound image localization on a position of a virtual sound source as right-ear audio information and left-ear audio information, and as the user listens to these pieces of sound information, a virtual feeling of listening to the sound from the position of the virtual sound source can be implemented. In the sound image localization, a distance from the virtual sound source and an orientation of the user with respect to the virtual sound source are acquired, and the sound image localization processing is performed on the audio content based on these pieces of information. The distance between the virtual sound source and the user can be calculated based on latitude and longitude information of the position of the virtual sound source and the position of the user. The orientation of the user with respect to the virtual sound source can be calculated based on the movement angle and the position information of the virtual sound source. The position of the virtual sound source may be the same as the target position information indicating the target position. Furthermore, in a case of implementing a feeling of listening to an utterance from an object located in the vicinity or an utterance of a virtual woman, the position may be a position corresponding to the object or virtual object provided in the vicinity of the user. As a result, it is possible to listen to the audio information subjected to the sound image localization according to the orientation of the head of the user when the user has entered the geofence. Therefore, even in a case where the entry angle to the geofence varies within a range of the entry angle threshold, it is possible to listen to the audio information as audio information from a predetermined position. The sound image localization processing unit 1016 can grasp absolute positions of a plurality of user terminals and generate audio information obtained by performing sound image localization on the position of the virtual sound source as the right-ear audio information and left-ear audio information.

OTHER EXAMPLE EMBODIMENTS

Figure 27:
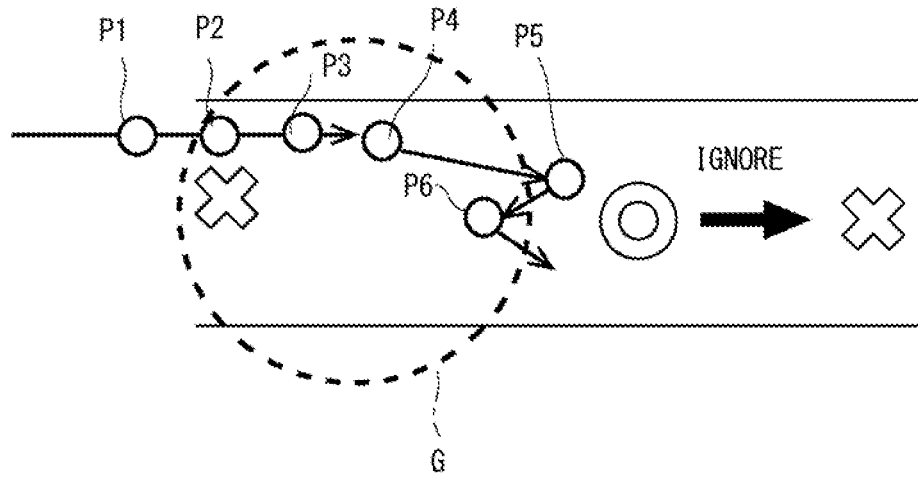
FIG. 27 is a diagram for describing a problem when a user passes through a geofence and exits.

FIG. 27 is a diagram illustrating a problem when the user passes through and exits the geofence.

In a case where the user enters the geofence G at an angle outside the entry angle threshold set for the geofence G, the provision control unit 1015 does not provide the content information. When the user moves through the geofence G and exits from the inside to the outside of the geofence, a defect due to erroneous detection occurs. For example, when the user stops due to a traffic light or the like in the vicinity of an exit position of the geofence (for example, a position P5 in FIG. 27), the position information of the user terminal is regarded to have entered the geofence at an angle within the entry angle threshold due to a GPS error, wobbling of the user, or the like, and the content information is unnecessarily provided to the user. In order to prevent such erroneous detection, even in a case where the user entered the geofence at an angle outside the angle threshold and then has entered at an angle within the angle threshold again, the provision control unit 1015 does not provide the content within a predetermined time from the first entry. The predetermined time here can be arbitrarily set in consideration of the average walking speed of the user and the size of the geofence. In this way, the provision control unit 1015 can ignore a case as illustrated in FIG. 27 within the predetermined time.

Figure 28:
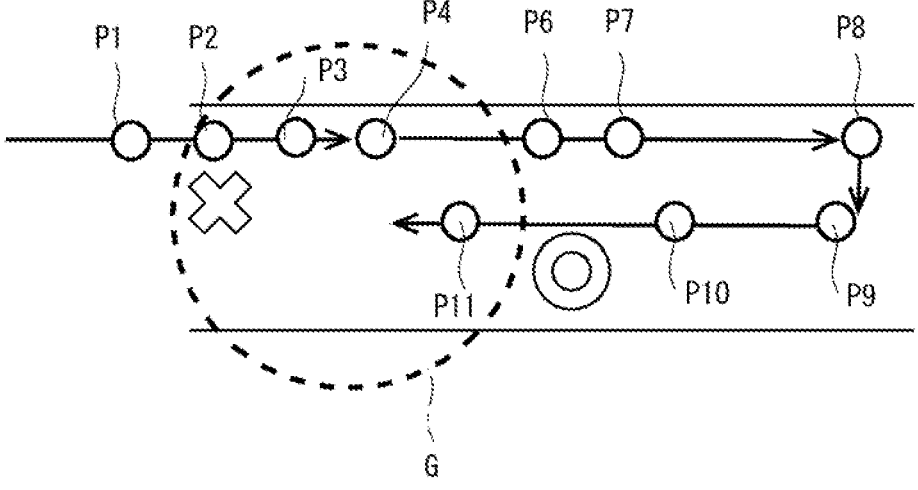
FIG. 28 is a diagram for describing a handling method when a user passes through and exits a geofence.

FIG. 28 is a diagram for describing a handling method when the user passes through the geofence.

In a case where the position of the user is detected at a plurality of positions (for example, P6, P7, and P8) outside the geofence after the user exits the geofence, the provision control unit 1015 may determine that the user has exited the geofence. Thereafter, when the user continues walking while changing his/her course and enters the geofence again at an angle within the entry angle threshold (a position P11 in FIG. 28), the provision control unit 1015 may provide the content. As described above, the provision control unit 1015 may determine that the user has exited the region after a predetermined time has elapsed from the exit of the user from the region (geofence). Alternatively, after the user exits from the region (geofence), the provision control unit 1015 may determine that the user has exited from the region after the user further advances from an exit position on a boundary of the region by a predetermined distance.

In the above example, the program can be stored using various types of non-transitory computer-readable media and supplied to a computer. The non-transitory computer-readable media include various types of tangible storage media. Examples of the non-transitory computer-readable medium include a magnetic recording medium (for example, a flexible disk, a magnetic tape, or a hard disk drive), an optical magnetic recording medium (for example, a magneto-optical disk), a compact disc-read only memory (CD-ROM), a CD-R, a CD-R/W, a digital versatile disc (DVD), a Blu-ray (registered trademark) disc (BD), and a semiconductor memory such as a mask ROM, a programmable ROM (PROM), an erasable PROM (EPROM), a flash ROM, or a random access memory (RAM). In addition, the program may be supplied to the computer by various types of transitory computer-readable media. Examples of the transitory computer-readable medium include electric signals, optical signals, and electromagnetic waves. The transitory computer-readable medium can provide the program to the computer via a wired communication line such as electric wires and optical fibers or a wireless communication line.

Note that the present disclosure is not limited to the above example embodiments, and can be appropriately changed without departing from the gist. For example, it is also possible to output the audio information for the audio AR in which a sound image localization position is set to the position of the target by using the sound image localization technology for the above-described audio service. In general, as the audio information for the audio AR, audio information processed based on the user position with respect to the target is output to a hearable device possessed by the user. In the information providing system according to the present example embodiment, when the entry of the geofence is detected, since a positional relationship between the user position and the target is almost the same, it is possible to output the processed audio information for the audio AR to the user terminal as it is based on the geofence position in advance without performing processing based on the position information of the user.

Some or all of the above example embodiments may be described as the following Supplementary Notes, but are not limited to the following.

(Supplementary Note 1)

An information providing apparatus including:

a storage unit configured to store content information and provision position information indicating a position where the content information is provided in association with each other;

a registration unit configured to register pieces of identification information of a plurality of user terminals possessed by a plurality of users, respectively, as a group;

a position information acquisition unit configured to acquire pieces of position information of the plurality of user terminals registered as the group;

a reaching detection unit configured to detect, from the position information of a first user terminal possessed by one user, that the one user among the plurality of users registered as the group has reached the position where the content information is provided;

a distance calculation unit configured to calculate a distance between the first user terminal and another user terminal in a case where the reaching is detected; and a provision control unit configured to provide the content information to the first user terminal and controls provision of the content information to another user terminal possessed by another user of the group based on the calculated distance in a case where the reaching is detected.

(Supplementary Note 2)

The information providing apparatus according to Supplementary Note 1, in which the reaching detection unit detects, from the position information of the first user terminal possessed by a first user, that the first user among the plurality of users registered as the group has reached the position where the content information is provided.

(Supplementary Note 3)

The information providing apparatus according to Supplementary Note 1, in which the reaching detection unit detects, from the position information of the first user terminal possessed by a preset representative user, that the representative user among the plurality of users registered as the group has reached the position where the content information is provided.

(Supplementary Note 4)

The information providing apparatus according to Supplementary Note 1, in which the provision control unit provides the content information to the another user terminal in a case where the calculated distance is equal to or less than a set value.

(Supplementary Note 5)

The information providing apparatus according to Supplementary Note 1, in which the provision control unit does not provide the content information to the another user terminal in a case where the calculated distance exceeds a set value.

(Supplementary Note 6)

The information providing apparatus according to Supplementary Note 1, in which the provision control unit does not provide the content information to the another user terminal in a case where the calculated distance exceeds a set value and another content is provided to the another user terminal.

(Supplementary Note 7)

The information providing apparatus according to Supplementary Note 1, in which the provision control unit provides another content for guiding to the position where the content information is provided to the another user terminal in a case where the calculated distance exceeds a set value and another content is not provided to the another user terminal.

(Supplementary Note 8)

The information providing apparatus according to Supplementary Note 7, in which in a case where the reaching detection unit detects, from the position information of the another user terminal, that the another user has reached the position where the content information is provided, and the provision control unit continuously provides the content information to the first user terminal, the provision control unit provides the content information continuously provided to the first user terminal halfway to the another user terminal.

(Supplementary Note 9)

The information providing apparatus according to Supplementary Note 7, in which in a case where the reaching detection unit detects, from the position information of the another user terminal, that the another user has reached the position where the content information is provided, and the provision control unit does not provide the content information to the first user terminal, the provision control unit provides the content information to the another user terminal from beginning.

26

(Supplementary Note 10)

An information providing system including:

a storage unit configured to store content information and provision position information indicating a position where the content information is provided in association with each other;

a registration unit configured to register pieces of identification information of a plurality of user terminals possessed by a plurality of users, respectively, as a group;

a position information acquisition unit configured to acquire pieces of position information of the plurality of user terminals registered as the group;

a reaching detection unit configured to detect, from the position information of a first user terminal possessed by one user, that the one user among the plurality of users registered as the group has reached the position where the content information is provided;

a distance calculation unit configured to calculate a distance between the first user terminal and another user terminal in a case where the reaching is detected; and a provision control unit configured to provide the content information to the first user terminal and controls provision of the content information to another user terminal possessed by another user of the group based on the calculated distance in a case where the reaching is detected.

(Supplementary Note 11)

The information providing system according to Supplementary Note 10, in which the reaching detection unit detects, from the position information of the first user terminal possessed by a first user, that the first user among the plurality of users registered as the group has reached the position where the content information is provided.

(Supplementary Note 12)

The information providing system according to Supplementary Note 10, in which the reaching detection unit detects, from the position information of the first user terminal possessed by a preset representative user, that the representative user among the plurality of users registered as the group has reached the position where the content information is provided.

(Supplementary Note 13)

The information providing system according to Supplementary Note 10, in which the provision control unit provides the content information to the another user terminal in a case where the calculated distance is equal to or less than a set value.

(Supplementary Note 14)

The information providing system according to Supplementary Note 10, in which the provision control unit does not provide the content information to the another user terminal in a case where the calculated distance exceeds a set value.

(Supplementary Note 15)

The information providing system according to Supplementary Note 10, in which the provision control unit does not provide the content information to the another user terminal in a case where the calculated distance exceeds a set value and another content is provided to the another user terminal.

(Supplementary Note 16)

The information providing system according to Supplementary Note 10, in which the provision control unit provides another content for guiding to the position where the content information is provided to the another user terminal in a case where the calculated distance exceeds a set value and another content is not provided to the another user terminal.

(Supplementary Note 17)

The information providing system according to Supplementary Note 16, in which in a case where the reaching detection unit detects, from the position information of the another user terminal, that the another user has reached the position where the content information is provided, and the provision control unit continuously provides the content information to the first user terminal, the provision control unit provides the content information continuously provided to the first user terminal halfway to the another user terminal.

(Supplementary Note 18)

The information providing system according to Supplementary Note 16, in which in a case where the reaching detection unit detects, from the position information of the another user terminal, that the another user has reached the position where the content information is provided, and the provision control unit does not provide the content information to the first user terminal, the provision control unit provides the content information to the another user terminal from beginning.

(Supplementary Note 19)

An information providing method including:

storing content information and provision position information indicating a position where the content information is provided in association with each other;

registering pieces of identification information of a plurality of user terminals possessed by a plurality of users, respectively, as a group;

acquiring pieces of position information of the plurality of user terminals registered as the group;

detecting, from the position information of a first user terminal possessed by one user, that the one user among the plurality of users registered as the group has reached the position where the content information is provided;

calculating a distance between the first user terminal and another user terminal in a case where the reaching is detected; and providing the content information to the first user terminal and controls provision of the content information to another user terminal possessed by another user of the group based on the calculated distance in a case where the reaching is detected.

(Supplementary Note 20)

The information providing method according to Supplementary Note 19, in which it is detected from the position information of the first user terminal possessed by a first user that the first user among the plurality of users registered as the group has reached the position where the content information is provided.

(Supplementary Note 21)

The information providing method according to Supplementary Note 19, in which it is detected from the position information of the first user terminal possessed by a preset representative user that the representative user among the plurality of users registered as the group has reached the position where the content information is provided.

(Supplementary Note 22)

The information providing method according to Supplementary Note 19, in which the content information is provided to the another user terminal in a case where the calculated distance is equal to or less than a set value.

(Supplementary Note 23)

The information providing method according to Supplementary Note 19, further comprising forgoing providing the content information to the another user terminal in a case where the calculated distance exceeds a set value.

(Supplementary Note 24)

The information providing method according to Supplementary Note 19, further comprising forgoing providing the content information to the another user terminal in a case where the calculated distance exceeds a set value and another content is provided to the another user terminal.

(Supplementary Note 25)

The information providing method according to Supplementary Note 19, in which another content for guiding to the position where the content information is provided is provided to the another user terminal in a case where the calculated distance exceeds a set value and another content is not provided to the another user terminal.

(Supplementary Note 26)

The information providing method according to Supplementary Note 25, in which in a case where it is detected from the position information of the another user terminal that the another user has reached the position where the content information is provided, and the content information is continuously provided to the first user terminal, the content information continuously provided to the first user terminal is provided halfway to the another user terminal.

(Supplementary Note 27)

The information providing method according to Supplementary Note 25, in which in a case where it is detected from the position information of the another user terminal that the another user has reached the position where the content information is provided, and the content information is not provided to the first user terminal, the content information is provided to the another user terminal from beginning.

(Supplementary Note 28)

A non-transitory computer-readable medium storing a program that causes a computer to perform:

storing content information and provision position information indicating a position where the content information is provided in association with each other;

registering pieces of identification information of a plurality of user terminals possessed by a plurality of users, respectively, as a group;

acquiring pieces of position information of the plurality of user terminals registered as the group;

detecting, from the position information of a first user terminal possessed by one user, that the one user among the plurality of users registered as the group has reached the position where the content information is provided;

calculating a distance between the first user terminal and another user terminal in a case where the reaching is detected; and providing the content information to the first user terminal and controls provision of the content information to another user terminal possessed by another user of the group based on the calculated distance in a case where the reaching is detected.

(Supplementary Note 29)

The non-transitory computer-readable medium according to Supplementary Note 28, in which the medium stores a program that causes a computer to perform detecting, from the position information of the first user terminal possessed by a first user, that the first user among the plurality of users registered as the group has reached the position where the content information is provided.

(Supplementary Note 30)

The non-transitory computer-readable medium according to Supplementary Note 28, in which it is detected from the position information of the first user terminal possessed by a preset representative user that the representative user among the plurality of users registered as the group has reached the position where the content information is provided.

(Supplementary Note 31)

The non-transitory computer-readable medium according to Supplementary Note 28, in which the content information is provided to the another user terminal in a case where the calculated distance is equal to or less than a set value.

(Supplementary Note 32)

The non-transitory computer-readable medium according to Supplementary Note 28, further comprising forgoing providing the content information to the another user terminal in a case where the calculated distance exceeds a set value.

(Supplementary Note 33)

The non-transitory computer-readable medium according to Supplementary Note 28, further comprising forgoing providing the content information to the another user terminal in a case where the calculated distance exceeds a set value and another content is provided to the another user terminal.

(Supplementary Note 34)

The non-transitory computer-readable medium according to Supplementary Note 28, in which another content for guiding to the position where the content information is provided is provided to the another user terminal in a case where the calculated distance exceeds a set value and another content is not provided to the another user terminal.

(Supplementary Note 35)

The non-transitory computer-readable medium according to Supplementary Note 34, in which in a case where it is detected from the position information of the another user terminal that the another user has reached the position where the content information is provided, and the content information is continuously provided to the first user terminal, the content information continuously provided to the first user terminal is provided halfway to the another user terminal.

(Supplementary Note 36)

The non-transitory computer-readable medium according to Supplementary Note 34, in which in a case where it is detected from the position information of the another user terminal that the another user has reached the position where the content information is provided, and the content information is not provided to the first user terminal, the content information is provided to the another user terminal from beginning.

REFERENCE SIGNS LIST

1 INFORMATION PROVIDING SYSTEM
5 CURSOR
8 USER
9 USER
10 SERVER
20 USER TERMINAL
30 NETWORK
100 INFORMATION PROVIDING APPARATUS
101 CONTROL UNIT
102 STORAGE UNIT
103 ACQUISITION UNIT
400 FACILITY
1011 REGISTRATION UNIT

1012 POSITION INFORMATION ACQUISITION UNIT
1013 REACHING DETECTION UNIT
1014 DISTANCE CALCULATION UNIT
1015 PROVISION CONTROL UNIT
1016 SOUND IMAGE LOCALIZATION PROCESSING UNIT
1017 MOVEMENT ANGLE SPECIFYING UNIT
1018 DIRECTION ACQUISITION UNIT
1019 ADJUSTMENT UNIT
1021 MAP INFORMATION DATABASE
1022 REGISTERED POSITION INFORMATION DATABASE
1023 USER INFORMATION DATABASE
1024 GROUP INFORMATION DATABASE
1025 GEOFENCE DATABASE
1026 CONTENT DATABASE
1027 HISTORY INFORMATION DATABASE

What is claimed is:

1. An information providing apparatus comprising:
a storage unit configured to store content information and provision position information indicating a position where the content information is provided in association with each other;
at least one memory storing instructions, and
at least one processor configured to execute the instructions to;
register pieces of identification information of a plurality of users, respectively, as a group;
acquire pieces of position information of the plurality of users registered as the group;
detect, from based on position information of a first user, that the first user among the plurality of users registered as the group has reached the position where the content information is provided;
calculate a distance between the first user and another user at a time at which the reaching is detected; and
provide the content information to the first user and controls provision of the content information to another user of the group based on the calculated at the time at which the reaching is detected.

2. The information providing apparatus according to claim 1, wherein the at least one processor is configured to execute the instructions to; detect, based on the position information of the first user, that the first user among the plurality of users registered as the group has reached the position where the content information is provided.

3. The information providing apparatus according to claim 1, wherein the at least one processor is configured to execute the instructions to detect, based on the position information of the first user, that a representative user among the plurality of users registered as the group has reached the position where the content information is provided.

4. The information providing apparatus according to claim 1, wherein the at least one processor is configured to execute the instructions to; provide the content information to the another user in a case in which the calculated distance is equal to or less than a set value.

5. The information providing apparatus according to claim 1, wherein the at least one processor is configured to execute the instructions to; forgo providing the content information to the another user in a case where the calculated distance exceeds a set value.

6. The information providing apparatus according to claim 1, wherein the at least one processor is configured to execute the instructions to; forgo providing the content information to the another user in a case in which the calculated distance exceeds a set value and another content is provided to the another user.

7. The information providing apparatus according to claim 1, wherein the at least one processor is configured to execute the instructions to; provide another content for guiding to the position where the content information is provided to the another user in a case in which the calculated distance exceeds a set value and the another content is not provided to the another user.

8. An information providing method comprising:
storing content information and provision position infor- mation indicating a position where the content infor- mation is provided in association with each other;
registering pieces of identification information of a plu- rality of users, respectively, as a group;
acquiring pieces of position information of the plurality of users registered as the group;
detecting, based on the position information of a first user, among the plurality of users registered as the group has reached the position where the content information is provided;
calculating a distance between the first user and another user at a time at which the reaching is detected; and
providing the content information to the first user and controls provision of the content information to another user of the group based on the calculated distance at a time at which the reaching is detected.

9. The information providing method according to claim 8, wherein it is detected based on the position information of the first user, that the first user among the plurality of users registered as the group has reached the position where the content information is provided.

10. The information providing method according to claim 8, wherein it is detected, based on the position information of the first user, that a representative user among the plurality of users registered as the group has reached the position where the content information is provided.

11. The information providing method according to claim 8, wherein the content information is provided to the another user in a case in which the calculated distance is equal to or less than a set value.

12. The information providing method according to claim 8, further comprising forgoing providing the content infor- mation to the another user in a case where the calculated distance exceeds a set value.

13. The information providing method according to claim 8, wherein further comprising forgoing providing the con- tent information to the another user in a case in which the calculated distance exceeds a set value and another content is provided to the another user.

14. The information providing method according to claim 8, wherein another content for guiding to the position where the content information is provided is provided to the another user in a case in which the calculated distance exceeds a set value and the another content is not provided to the another user.

15. A non-transitory computer-readable medium storing a program that causes a computer to perform:
storing content information and provision position infor- mation indicating a position where the content infor- mation is provided in association with each other;
registering pieces of identification information of a plu- rality of users, respectively, as a group;
acquiring pieces of position information of the plurality of users registered as the group;
detecting, based on the position information of a first use, that the first user among the plurality of users registered as the group has reached the position where the content information is provided;
calculating a distance between the first user and another user at a time at which the reaching is detected; and
providing the content information to the first user and controls provision of the content information to another user of the group based on the calculated distance at the time at which the reaching is detected.

16. The non-transitory computer-readable medium according to claim 15, wherein the non-transitory computer- readable medium stores the program that causes the com- puter to perform detecting, based on the position informa- tion of the first user, that the first user among the plurality of users registered as the group has reached the position where the content information is provided.

17. The non-transitory computer-readable medium according to claim 15, wherein it is detected, based on the position information of the first user, that a representative user among the plurality of users registered as the group has reached the position where the content information is pro- vided.

18. The non-transitory computer-readable medium according to claim 15, wherein the content information is provided to the another user in a case in which the calculated distance is equal to or less than a set value.

19. The non-transitory computer-readable medium according to claim 15, further comprising forgoing provid- ing the content information to the another user in a case in which the calculated distance exceeds a set value.

20. The non-transitory computer-readable medium according to claim 15, further comprising forgoing provid- ing the content information to the another user in a case in which the calculated distance exceeds a set value and another content is provided to the another user.

\* \* \* \* \*